(12) United States Patent
Cusson et al.

(10) Patent No.: US 8,256,169 B2
(45) Date of Patent: *Sep. 4, 2012

(54) SUPPORT SYSTEM FOR SOLAR PANELS

(75) Inventors: Paul R. Cusson, West Hartford, CT (US); Robert J. Voytilla, Hubbard, OH (US); Michael G. Greenamyer, Salem, OH (US); Thomas P. Kilar, Jr., Boardman, OH (US)

(73) Assignee: Northern States Metals Company, West Hartford, CT (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/686,598

(22) Filed: Jan. 13, 2010

(65) Prior Publication Data

US 2010/0236183 A1    Sep. 23, 2010

Related U.S. Application Data

(63) Continuation-in-part of application No. 12/567,908, filed on Sep. 28, 2009, which is a continuation-in-part of application No. 12/383,240, filed on Mar. 20, 2009.

(51) Int. Cl.
*E04D 1/30* (2006.01)
*E04D 3/06* (2006.01)

(52) U.S. Cl. ........... 52/173.3; 52/245; 52/244; 126/621; 126/623

(58) Field of Classification Search ........... 52/173.3, 52/29, 171.1; 136/244, 245, 243, 206; 126/621–623
See application file for complete search history.

(56) References Cited

U.S. PATENT DOCUMENTS

| 1,893,481 | A | 1/1933 | Adams |
| 2,673,632 | A | 3/1954 | Stiranka |
| 2,938,068 | A | 5/1960 | Silverschotz |
| 3,210,716 | A | 10/1965 | Meacham |
| 3,261,086 | A | 7/1966 | Dunn |
| 3,844,087 | A | 10/1974 | Schultz et al. |
| 4,006,731 | A | 2/1977 | Carroll |
| 4,159,604 | A | 7/1979 | Burrell |

(Continued)

FOREIGN PATENT DOCUMENTS

CN        1900458 A    1/2007

(Continued)

OTHER PUBLICATIONS

Krannich Solar, Inc. K-2 Systems, Mounting Systems for Solar Technology (7 pages); website http://cms.krannich-solar.com/usa/upload/pdf/K2/image_K2_USA_VIEW.pdfl; publication date unknown.

(Continued)

*Primary Examiner* — Phi D. A
(74) *Attorney, Agent, or Firm* — Roth Blair Roberts Strasfeld & Lodge

(57) ABSTRACT

Precise parameters are maintained in a support system for solar panels or other panel-like structures through use of a collapsible folding, support frame which is preassembled to precise tolerances at a convenient staging site before being collapsed for shipment. Installation on flat roofs is also facilitated through the use of a roof interface frame which rotatably supports the panel support frame of the support system and folds along with it at the assembly, staging site.

10 Claims, 25 Drawing Sheets

U.S. PATENT DOCUMENTS

| | | | |
|---|---|---|---|
| 4,162,595 A | 7/1979 | Ramos et al. | |
| 4,269,173 A | 5/1981 | Krueger et al. | |
| 4,278,072 A | 7/1981 | Ryan et al. | |
| 4,452,027 A | 6/1984 | Desai | |
| 4,452,234 A | 6/1984 | Withjack | |
| 4,466,424 A * | 8/1984 | Lockwood, Jr. | 126/621 |
| 4,580,385 A | 4/1986 | Field | |
| 4,680,905 A | 7/1987 | Rockar | |
| 4,721,555 A | 1/1988 | Grosshandler | |
| 4,789,070 A | 12/1988 | Bennett | |
| 4,892,632 A | 1/1990 | Morris | |
| 4,966,631 A | 10/1990 | Matlin et al. | |
| 4,977,646 A | 12/1990 | McCraw | |
| 5,125,608 A | 6/1992 | McMaster et al. | |
| 5,143,556 A | 9/1992 | Marlin | |
| 5,228,258 A | 7/1993 | Onoda et al. | |
| 5,232,518 A | 8/1993 | Nath et al. | |
| 5,299,396 A | 4/1994 | Raap et al. | |
| 5,308,037 A | 5/1994 | Gonzalez | |
| 5,546,713 A | 8/1996 | Voegele et al. | |
| 5,634,644 A | 6/1997 | Guillon | |
| 5,706,617 A | 1/1998 | Hirai et al. | |
| 5,735,100 A | 4/1998 | Campbell | |
| 5,762,720 A | 6/1998 | Hanoka et al. | |
| 5,946,874 A | 9/1999 | Roberts | |
| 5,969,501 A | 10/1999 | Glidden et al. | |
| 5,986,203 A | 11/1999 | Hanoka et al. | |
| 6,046,399 A | 4/2000 | Kapner | |
| 6,056,283 A | 5/2000 | Gage et al. | |
| 6,065,255 A | 5/2000 | Stern et al. | |
| 6,111,189 A | 8/2000 | Garvison et al. | |
| 6,141,923 A | 11/2000 | Habicht et al. | |
| 6,370,828 B1 | 4/2002 | Genschorek | |
| 6,389,770 B1 | 5/2002 | Santavicca | |
| 6,501,013 B1 | 12/2002 | Dinwoodie | |
| 6,617,507 B2 | 9/2003 | Mapes et al. | |
| 6,672,018 B2 | 1/2004 | Shingleton | |
| 6,784,359 B2 | 8/2004 | Clark et al. | |
| 6,799,398 B1 * | 10/2004 | Plevyak | 52/173.3 |
| 6,959,517 B2 | 11/2005 | Poddany et al. | |
| 6,988,344 B1 | 1/2006 | Krueger | |
| 7,012,188 B2 * | 3/2006 | Erling | 136/251 |
| 7,307,209 B2 | 12/2007 | Mapes et al. | |
| 7,406,800 B2 | 8/2008 | Cinnamon et al. | |
| 7,435,897 B2 * | 10/2008 | Russell | 136/244 |
| 7,600,350 B2 * | 10/2009 | Braunstein | 52/173.3 |
| 7,845,120 B2 | 12/2010 | Thome et al. | |
| 7,939,754 B2 | 5/2011 | Richter et al. | |
| 7,987,641 B2 | 8/2011 | Cinnamon | |
| 2002/0088905 A1 | 7/2002 | Hansen | |
| 2003/0015636 A1 | 1/2003 | Liebendorfer | |
| 2003/0019180 A1 | 1/2003 | Warren et al. | |
| 2003/0070368 A1 | 4/2003 | Shingleton | |
| 2003/0094193 A1 | 5/2003 | Mapes et al. | |
| 2003/0097806 A1 | 5/2003 | Brown | |
| 2003/0101662 A1* | 6/2003 | Ullman | 52/27 |
| 2004/0163338 A1 | 8/2004 | Liebendorfer | |
| 2004/0231274 A1 | 11/2004 | Engstrom | |
| 2005/0072103 A1 | 4/2005 | Hopwood | |
| 2005/0103376 A1 | 5/2005 | Matsushita et al. | |
| 2005/0218657 A1* | 10/2005 | Weesner et al. | 290/55 |
| 2006/0156651 A1 | 7/2006 | Genschorek | |
| 2006/0174931 A1 | 8/2006 | Mapes et al. | |
| 2007/0102036 A1 | 5/2007 | Cinnamon | |
| 2007/0151594 A1 | 7/2007 | Mascolo et al. | |
| 2007/0251567 A1 | 11/2007 | Plaisted | |
| 2008/0010915 A1 | 1/2008 | Liebendorfer | |
| 2008/0016818 A1 | 1/2008 | Heirich | |
| 2008/0053517 A1 | 3/2008 | Plaisted et al. | |
| 2008/0087320 A1 | 4/2008 | Mapes et al. | |
| 2008/0172955 A1 | 7/2008 | McClintock et al. | |
| 2008/0264467 A1 | 10/2008 | Doko et al. | |
| 2008/0302407 A1* | 12/2008 | Kobayashi | 136/251 |
| 2008/0302928 A1 | 12/2008 | Haddock | |
| 2009/0025710 A1 | 1/2009 | Hogan | 126/652 |
| 2009/0056698 A1 | 3/2009 | Johnson et al. | |
| 2009/0151775 A1* | 6/2009 | Pietrzak | 136/251 |
| 2009/0256046 A1 | 10/2009 | Hausner et al. | |
| 2009/0282755 A1 | 11/2009 | Abbott et al. | |
| 2009/0302183 A1 | 12/2009 | Strizki | |
| 2010/0089389 A1* | 4/2010 | Seery et al. | 126/608 |
| 2010/0089390 A1* | 4/2010 | Miros et al. | 126/608 |
| 2010/0146899 A1* | 6/2010 | Zante | 52/584.1 |
| 2010/0154786 A1* | 6/2010 | Li | 126/624 |
| 2010/0193012 A1 | 8/2010 | Klammer et al. | |
| 2010/0236183 A1 | 9/2010 | Cusson et al. | |
| 2010/0237028 A1 | 9/2010 | Cusson | |
| 2010/0237029 A1* | 9/2010 | Cusson et al. | 211/41.1 |
| 2010/0269446 A1 | 10/2010 | Merrifield | |
| 2010/0307991 A1 | 12/2010 | Belikoff et al. | |
| 2011/0068244 A1* | 3/2011 | Hartelius et al. | 248/298.1 |
| 2011/0072631 A1 | 3/2011 | Hartelius et al. | |

FOREIGN PATENT DOCUMENTS

| | | |
|---|---|---|
| CN | 101095017 A | 12/2007 |
| CN | 201014798 Y | 1/2008 |
| CN | 100424305 C | 10/2008 |
| CN | 101345269 | 1/2009 |
| CN | 101345269 A | 1/2009 |
| CN | 201188591 Y | 1/2009 |
| CN | 101387151 A | 3/2009 |
| CN | 201256369 Y | 6/2009 |
| CN | 201435696 | 3/2010 |
| CN | 201498521 | 6/2010 |
| CN | 201576689 | 9/2010 |
| CN | 201757526 | 3/2011 |
| CN | 101387151 | 5/2011 |
| EP | 0 993 051 A2 | 4/2000 |
| EP | 2 211 555 | 8/2010 |
| EP | 2 339 262 | 6/2011 |
| JP | 61199671 A * | 9/1986 |
| JP | 02003534 A * | 1/1990 |
| JP | 3212629 | 9/1991 |
| JP | 04146897 A | 5/1992 |
| JP | 04146897 A * | 5/1992 |
| WO | WO 97/19291 A1 | 5/1997 |
| WO | WO 2006/072230 A1 | 7/2006 |
| WO | WO 2008/124158 | 10/2008 |
| WO | WO 2008/145903 A1 | 12/2008 |
| WO | WO 2009/015424 A1 | 2/2009 |
| WO | WO 2009/146511 | 12/2009 |
| WO | WO 2010/045514 | 4/2010 |
| WO | WO 2010/053089 | 5/2010 |
| WO | WO 2010/057781 | 5/2010 |
| WO | WO 2010/064656 | 6/2010 |
| WO | WO 2010/107419 | 9/2010 |
| WO | WO 2010/107466 | 9/2010 |
| WO | WO 2010/130720 | 11/2010 |
| WO | WO 2011/016498 | 2/2011 |
| WO | WO 2011/023902 | 3/2011 |
| WO | WO 2011/029758 | 3/2011 |

OTHER PUBLICATIONS

First Solar Inc.; FS3X5 Installation Instruction Manual No. SD-2-02104001, Rev. 1 (13 pages) with David Bohling Engineer CAD drawing (6 pages); website www.firstsolar.com; publication date unknown.

Krannich Solar, Inc.; K-2 Systems, Mounting Systems for Solar Technology (7 pages); website http://cms.krannich-solar.com/usa/upload/pdf/K2/image_K2_USA_VIEW.pdf; publication date unknown.

First Solar, Inc.; FS3X5 Installation Instruction Manual No. SD-2-02104001, Rev. 1 (13 pages) with David Bohling, Engineer CAD drawing (6 pages); website www.firstsolar.com; publication date unknown.

Krannich Solar, Inc. K-2 Systems, Mounting Systems for Solar Technology (7 pages); website http//cms.krannich-solar.com/usa/upload/pdf/K2/image_K2_USA_VIEW.pdfl; publication date unknown.

First Solar Inc.; FS3X5 Installation Instruction Manual No. SD-2-0210400I, Rev 1 (13 pages) with David Bohling Engineer CAD drawing (6 pages); website www.firstsolar.com: publication date unknown.

Scheltter Solar Mounting Systems Mounting and project planning, Scheltter Inc., Manual [online], Mar. 10, 2010 [retrieved on Oct. 31, 2011]. Retrieved from the internet: URL:http://www.schletter.us/support/Mounting%20and%20proj.

* cited by examiner

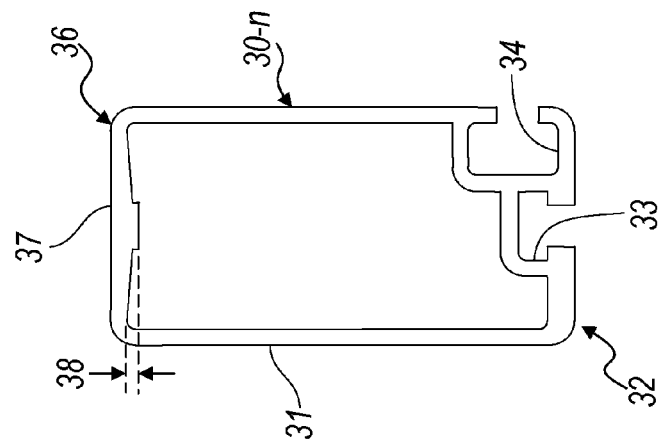
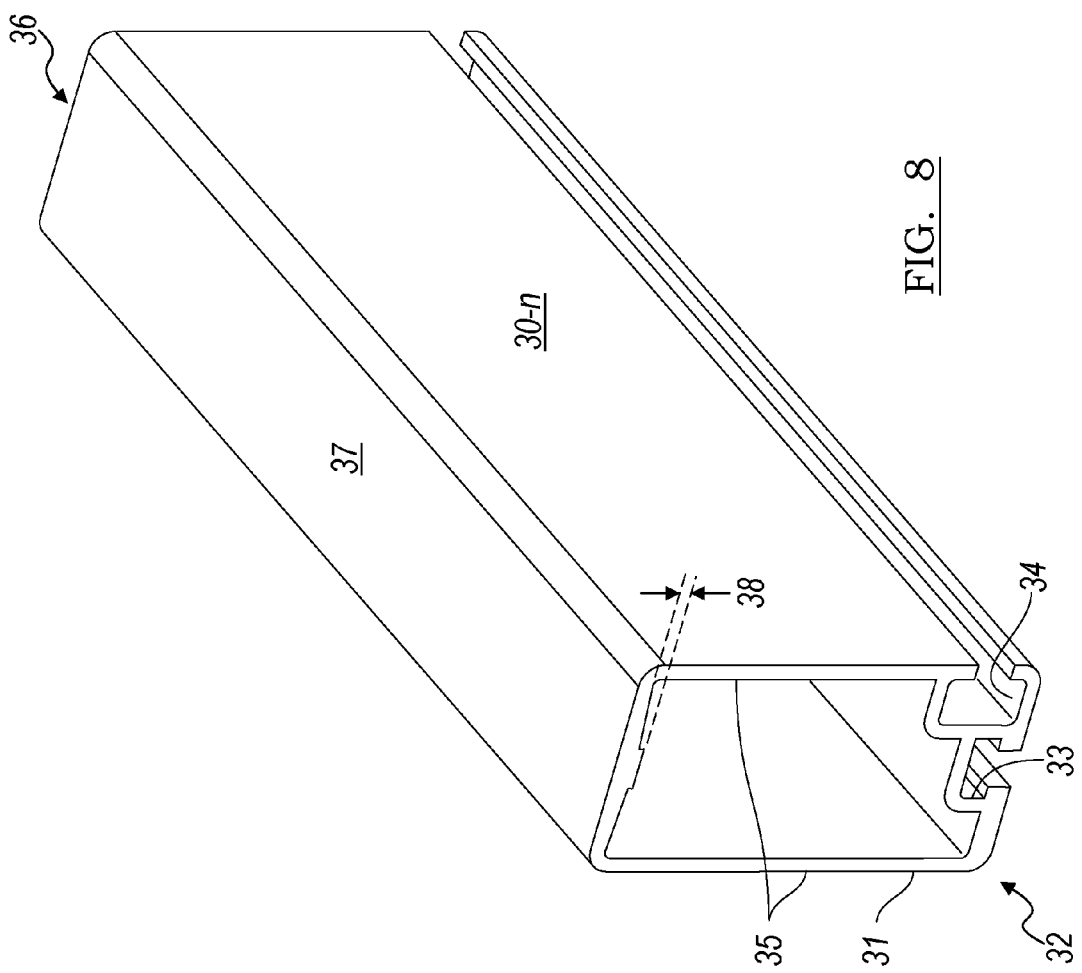

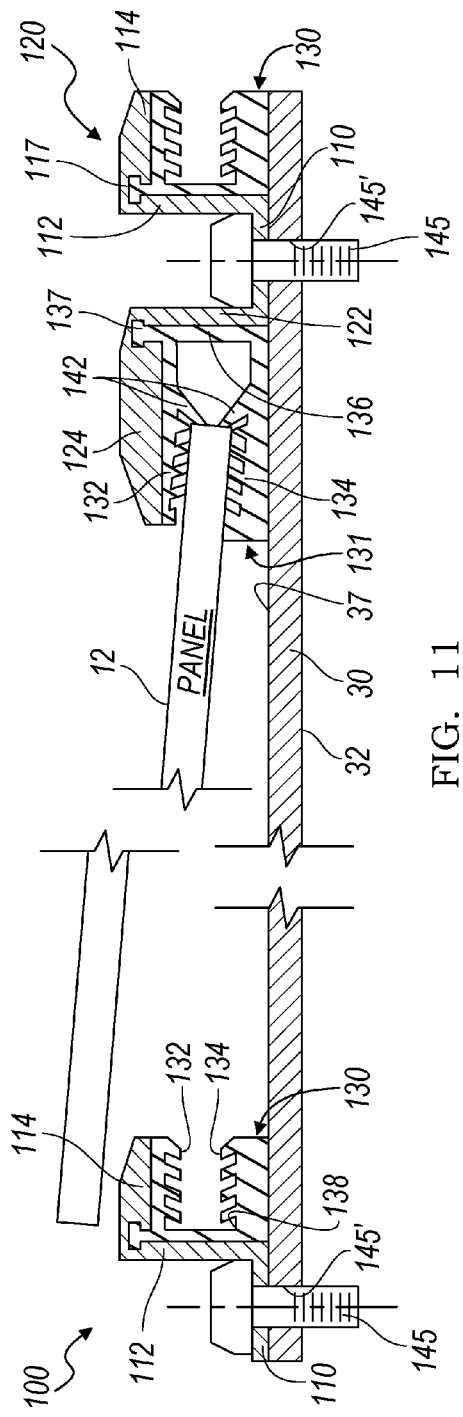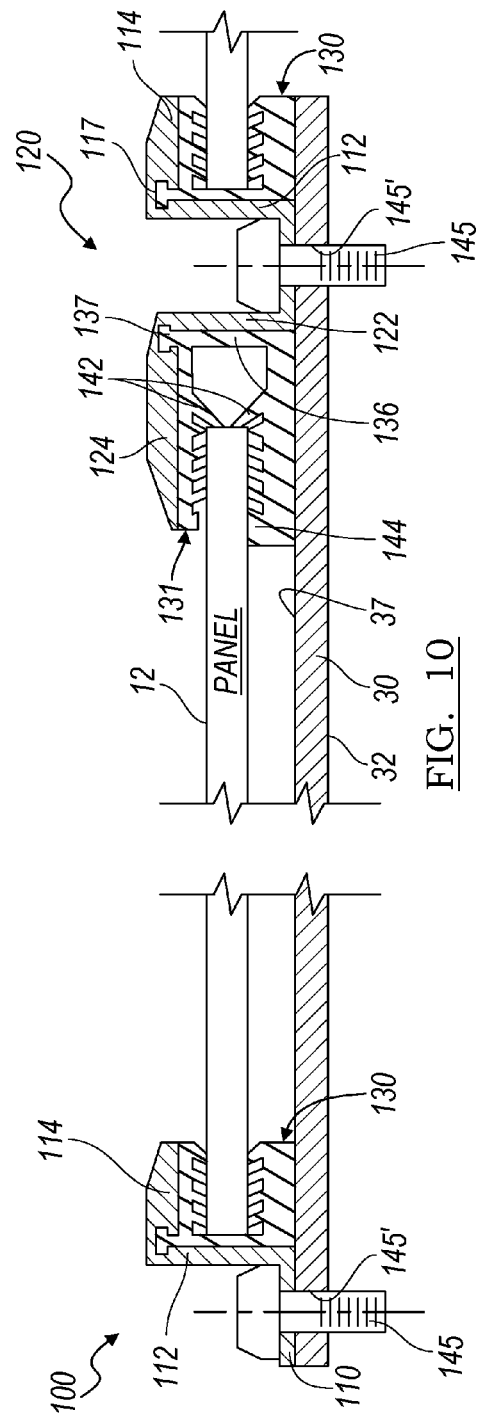

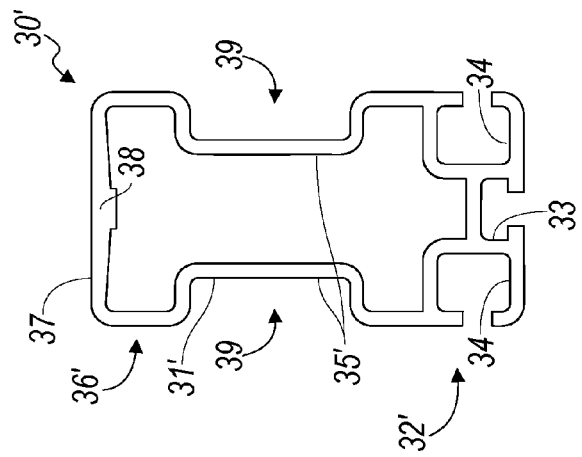
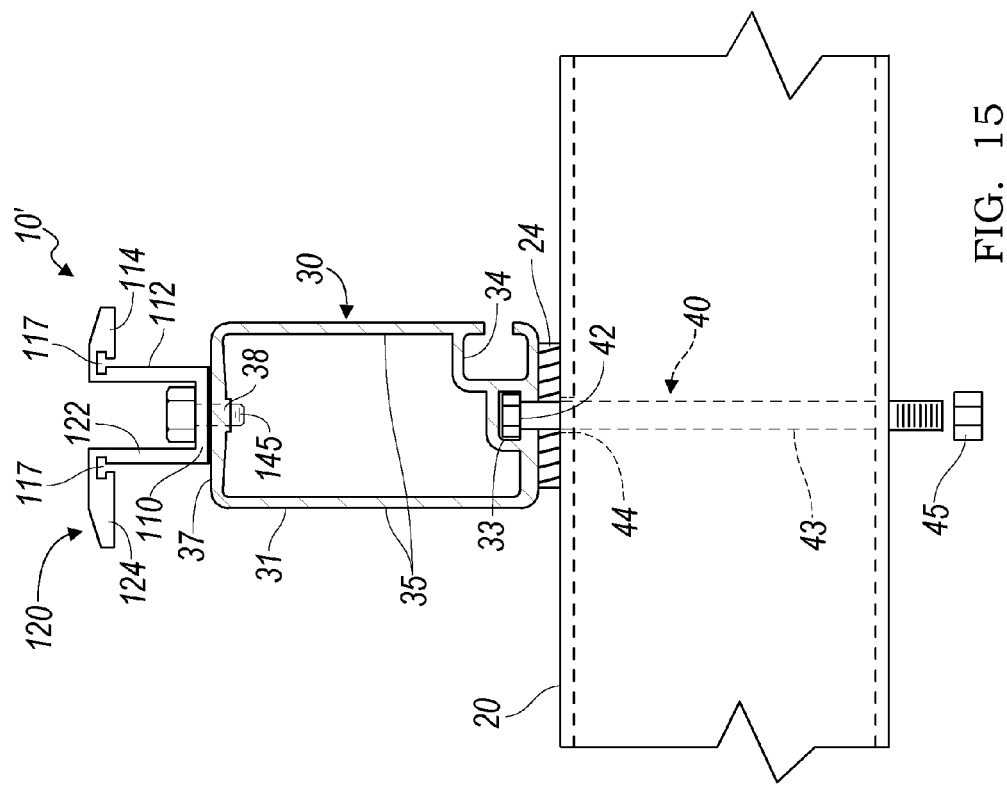
FIG. 17
FIG. 15

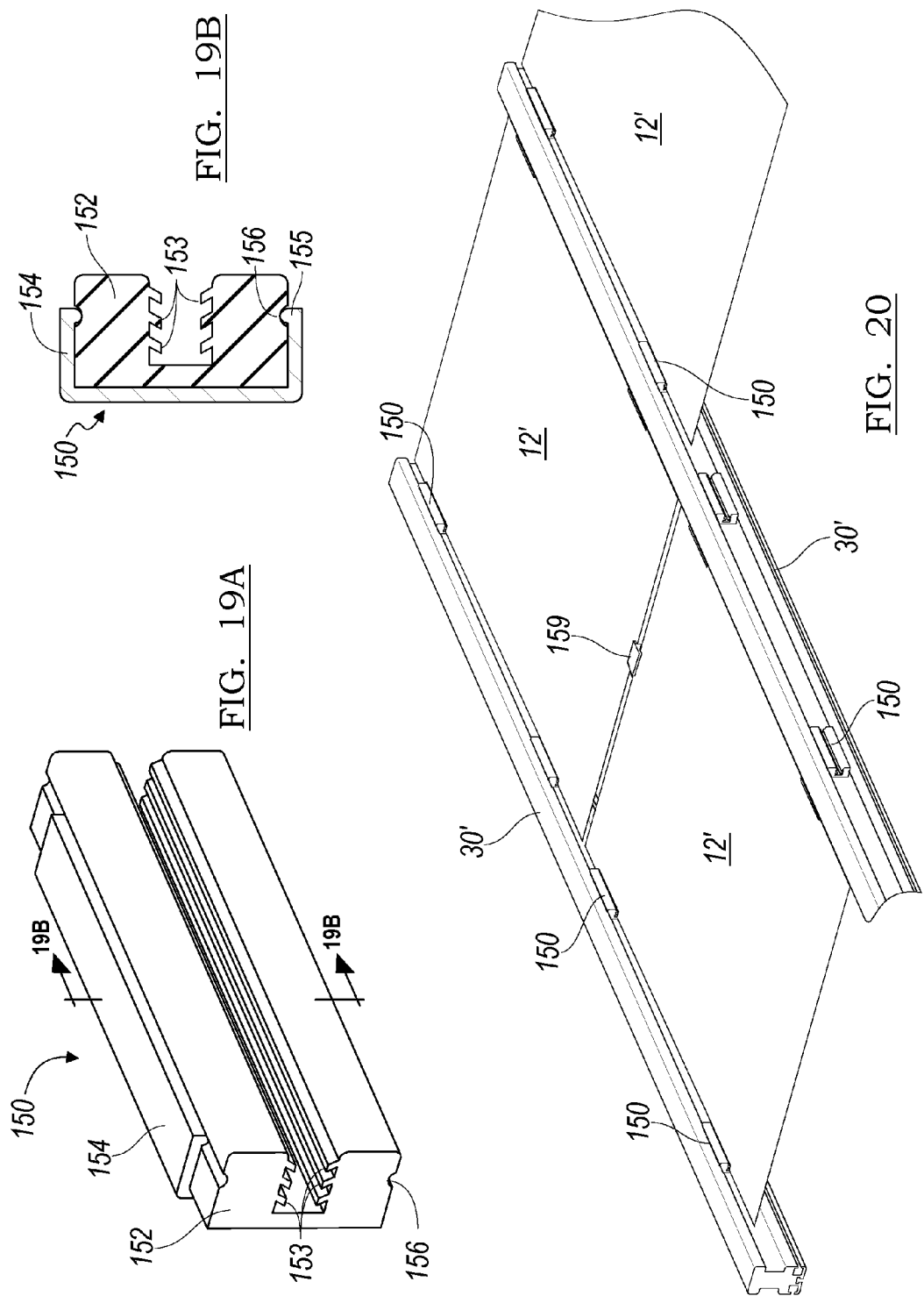

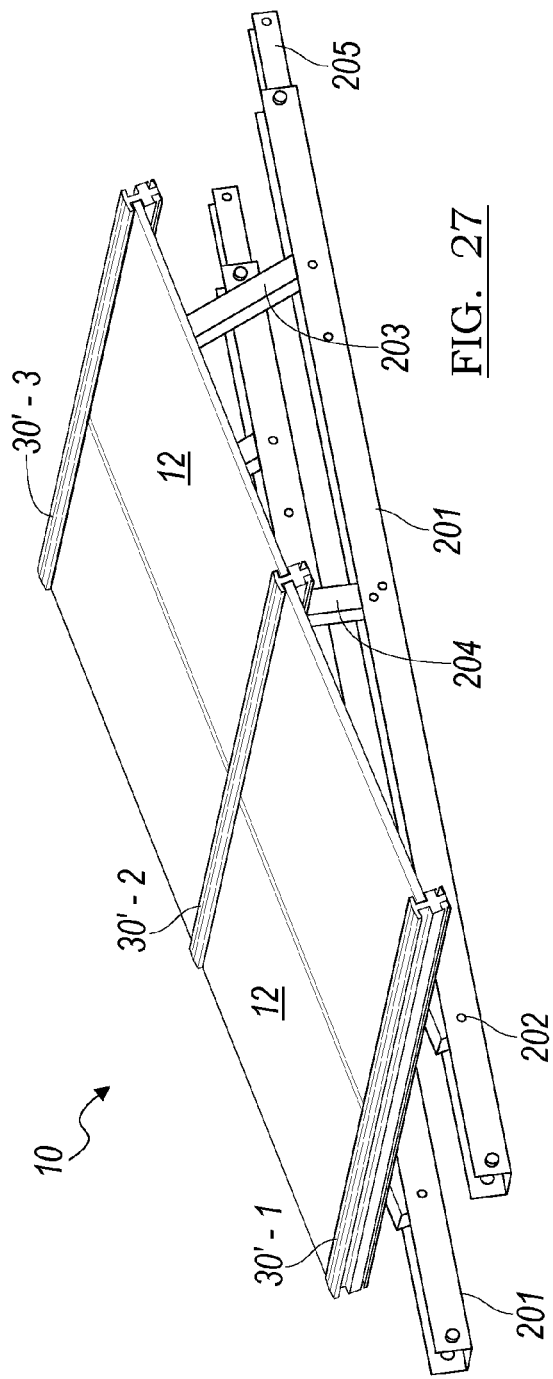
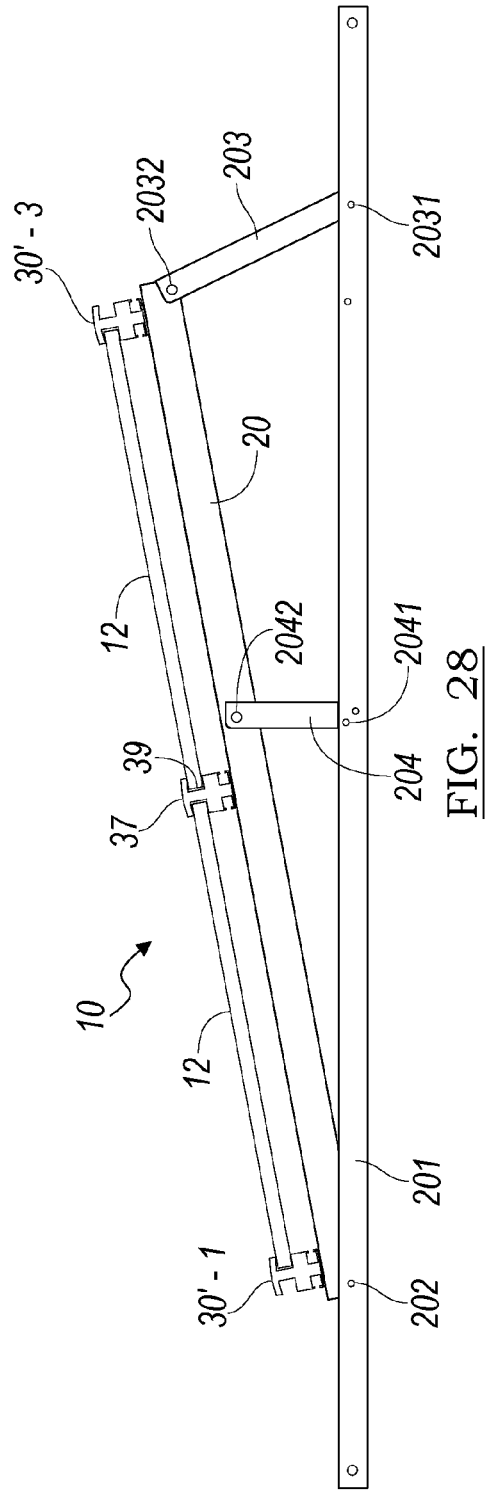
FIG. 27
FIG. 28

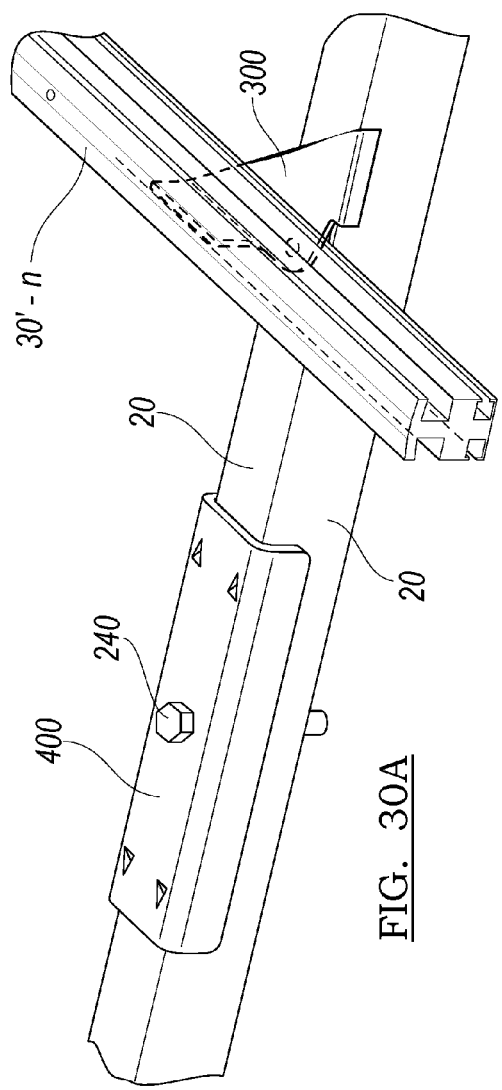
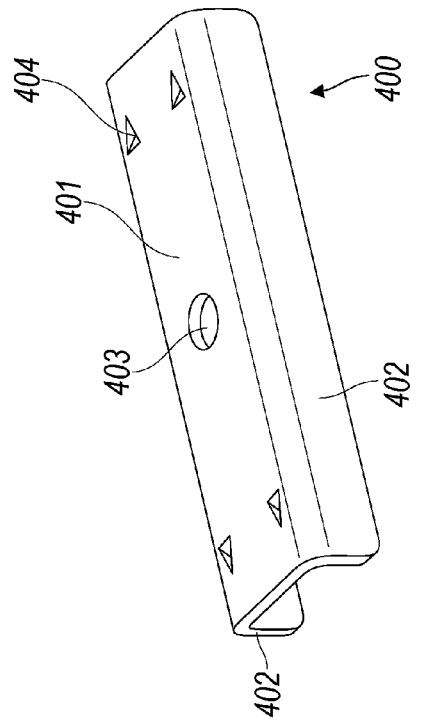
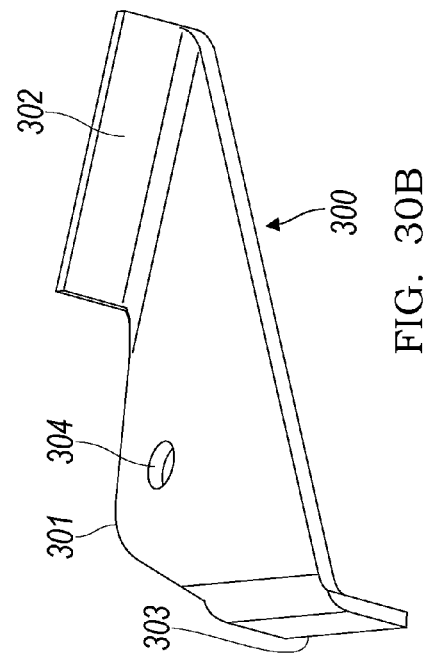
FIG. 30A
FIG. 30B
FIG. 30C

SUPPORT SYSTEM FOR SOLAR PANELS

PRIORITY INFORMATION

The present application claims priority as a continuation-in-part application from U.S. patent application Ser. No. 12/567,908 filed on Sep. 28, 2009, which is a continuation-in-part application from parent U.S. patent application Ser. No. 12/383,240 filed on Mar. 20, 2009. Reference is made to both applications and their contents are incorporated herein in their entirety.

FIELD OF THE INVENTION

This invention relates to a solar energy collection system, and more particularly to a support system for an array of photovoltaic panels and method of assembling the same. The invention includes a bi-directional span of support members, including a profiled support rail having a longitudinal T-slot channel adapted to receive the head of a bolt for adjustable attachment to a support joist. A variety of panel holding devices, such as friction clips, may also be used.

BACKGROUND OF THE INVENTION

A standard photovoltaic panel array includes a plurality of solar panels optimally arranged for converting light incident upon the panels to electricity. Various support systems are used for attachment to roofs, free-field ground racks or tracking units. Typically, these support systems are costly, labor intensive to install, heavy, structurally inferior and mechanically complicated. For example, a support system generally includes off-the-shelf metal framing channels having a C-shaped cross-section, such as those sold under the trademarks UNISTRUT™ or BLIME™, improvised for use as vertical and horizontal support members. The photovoltaic panels are directly secured to the support members and held in place by clips. The clips serve as hold-down devices to secure the panel against the corresponding top support member in spaced-relationship. The clips are positioned and attached about the panel edges once each panel is arranged in place.

For a free-field ground rack system as shown in FIG. 1, support elements, such as I-beams, are spaced and securely embedded vertically in the ground. Tilt brackets are installed at the top of each I-beam, and each tilt bracket is secured to the I-beam such that a tilt bracket flange extends above the I-beam at an angle as best seen in FIG. 2A. As shown in this case, two UNISTRUT™ joists span the tilt brackets and are secured thereto. As seen in FIG. 2B, UNISTRUT™ rails are positioned across and fastened to the horizontal joists. To secure each rail to the corresponding horizontal joists, a bolt through a bolt hole made in the rail sidewall attaches to a threaded opening in a transverse nut-like plate slideably mounted inside the channel of the UNISTRUT™ joist, so that the nut-like plate engages and tightly secures against the upper flange of the joist's C-channel as seen in FIG. 2A. Importantly, the width of the plate is slightly less than the width of the channel, so that the plate can be slideably adjusted in the channel, without the plate rotating therein.

Once the bi-directional span is assembled, each solar panel is positioned and top and bottom clips are secured to each rail about the perimeter of each panel, to hold the panel such that the center of each panel is between two rails.

Another example of a support system is shown in U.S. Pat. No. 5,762,720, issued to Hanoka et al., which describes various mounting brackets used with a UNISTRUT™ channel. Notably, the Hanoka et al. patent uses a solar cell module having an integral mounting structure, i.e. a mounting bracket bonded directly to a surface of the backskin layer of a laminated solar cell module, which is then secured to the channel bracket by bolt or slideably engaging C-shaped members. Other examples are shown in U.S. Pat. No. 6,617,507, issued to Mapes et al., U.S. Pat. No. 6,370,828, issued to Genschorek, U.S. Pat. No. 4,966,631, issued to Matlin et al., and U.S. Pat. No. 7,012,188, issued to Erling.

Notably, existing support systems require meticulous on-site assembly of multiple parts, performed by expensive field labor. Assembly is often performed in unfavorable working conditions, i.e. in harsh weather and over difficult terrain, without the benefit of quality control safeguards and precision tooling. Misalignment of the overall support assembly often occurs. This can jeopardize the supported solar panels, or other supported devices.

For example, spacing of the photovoltaic panels is important to accommodate expansion and contraction due to the change of the weather. It is important, therefore, that the panels are properly spaced for maximum use of the bi-directional area of the span. Different spacing may be required on account of different temperature swings within various geographical areas. It is difficult, however, to precisely space the panels on-site using existing support structures without advanced technical assistance. For example, with the existing design described above (with reference to FIGS. 2A and 2B), until the rails are tightly secured to the horizontal joist, each rail is free to slide along the horizontal joists and, therefore, will need to be properly spaced and secured once mounted on-site. Further, since the distance between the two horizontal joists is fixed on account of the drilled bolt holes through the rails, it is preferred to drill the holes on-site, so that the horizontal joists can be aligned to attach through the pre-drilled attachment holes of the tilt bracket. Unfortunately, the operation of drilling the holes on-site requires skilled workers, and even with skilled installation, might still result in misalignment of the support structure and/or the solar panels supported by that structure.

The mounting bracket arrangement (14, 16, as depicted in FIGS. 1 through 4B), is not the only manner in which an array of solar panels, or other panel-like structures can be mounted. This support arrangement is not always available. Rather, there are many framing substrates and support systems upon which solar panels or other panel-like structures can be mounted. For example, the roofs of many structures may not support the vertical supports 14 upon which brackets 16 rest. This is particularly crucial since in many locations a roof or roof-like structure is the only support substrate that would be available for solar panels. While the support structure 14, 16 includes well-known support parameters, the same is not true of roofs or roof-like structures. These can exhibit a wide variety of different support parameters and other characteristics. Further, most roof-like substrates that are used to support solar cell arrays tend to be flat (providing a level of predictability not found in the use of sloped, i.e. pitched, roofs as panel substrates). Flat roofs are preferred since they avoid the substantial problems of sloped roof mountings.

Even a stable flat roof presents problems for the mounting or an array of solar panels. In particular, the panels cannot be mounted in the same manner that is provided in FIGS. 1 through 4B of the present application. The stresses that are allowable on a roof structure are far different than those that can be applied to the vertical support and bracket (14, 16) arrangement of FIGS. 1 through 4B. As a result, a whole new set of considerations apply. Foremost among these considerations is the necessity to avoid any damage to the roof while securing a panel array that can become quite elaborate.

Therefore, a need exists, for a low-cost, uncomplicated, structurally strong support system and assembly method, so as to optimally position and easily attach the plurality of photovoltaic panels, while meeting architectural and engineering requirements.

At present, none of the conventional art offers these capabilities. An improved support system would achieve a precise configuration in the field without extensive work at the installation site. The use of such an improved system would facilitate easy placement of solar panels onto the support structure. Further, a variety of different panel clips or holders could be used within the overall concept of the system. The shipping configuration of the improved support system would be such so as to be easily handled in transit while still facilitating rapid deployment. Rapid deployment must be facilitated on a roof or a roof-like structure, providing a stable support for the panels without damaging or otherwise compromising the roof, or any similar substrate.

SUMMARY OF THE INVENTION

It is a primary object of the present invention to improve upon conventional photovoltaic solar panel systems, especially with regard to assembly and installation.

It is another object of the present invention to provide a support and installation system for solar panels in which the panels are less likely to be damaged during installation.

It is a further object of the present invention to provide a support system for solar panels that is easily installed on-site while still resulting in a precise configuration for purposes of mounting the solar panels.

It is an additional object of the present invention to provide a solar panel support system that can be assembled very quickly on site.

It is still another object of the present invention to provide a solar panel support system that can achieve close tolerances during field installation without the necessity of skilled labor at installation.

It is again a further object of the present invention to provide a solar panel support system in which specialized mounting brackets bonded to the solar panels are not necessary for the mounting of the solar panels to the support system.

It is still an additional object of the present invention to provide a solar panel support system which can be easily adapted to a wide variety of solar panel array sizes and shapes.

It is yet another object of the present invention to provide a solar panel support system which minimizes the necessity for precise measurements at the installation site.

It is again a further object of the present invention to provide a solar panel support system that can be arranged at a variety of different positions and exposure angles.

It is still an additional object of the present invention to provide a solar panel support system that can be precisely configured to a specific environment.

It is another object of the present invention to provide a support system for solar panels and other panel-like structures in which degradation caused by metal-to-metal contact is substantially reduced.

It is again another object of the present invention to provide a support system for panel-like structures in which accommodation is made for movement caused by changes in temperatures, humidity or other environmental considerations.

It is still a further object of the present invention to provide a roof interface framework for a solar panel support system.

It is yet an additional object of the present invention to provide a system for tilting the solar panel support system to a desired angle with respect to a substrate upon which the support system is mounted.

It is again another object of the present invention to provide a flexible arrangement for interfacing a solar panel support system to a roof or other similar substrate in order to accommodate a wide variety of different panel configurations.

It is still an additional object of the present invention to provide a solar panel mounting system that can accommodate easy installation and removal of panels on adjacent frameworks.

It is again another object of the present invention to provide a roof interface framework with a foldable solar panel support system, wherein the roof interface system is foldable in conjunction with the solar panel support system.

It is yet another object of the present invention to provide a roof interface framework that can be used for interlocking a number of panel support systems together in a manner that achieves structural stability.

It is still a further object of the present invention to provide a folding solar panel support system in which rotation of structural members with respect to each other can be advantageously controlled.

It is yet an additional object of the present invention to provide a folding solar panel support system adapted specifically for roofs and roof-like substrates.

It is again another object of the present invention to provide a roof interface framework for a solar panel support system that allows the support system to be elevated to a desired angle.

It is another object of the present invention to provide a roof interface framework for a solar panel support system that allows a bi-directional panel support frame to be easily disconnected and pivoted back, i.e. at an angle opposite to its desired pitch, to reach the underside of the solar panels during installation and/or for easy cleaning.

It is yet another object of the present invention to provide a roof interface framework for a solar panels support structure which allows easy installation of adjacent panel support systems, without interfering with previously installed panels.

It is still an additional object of the present invention to provide a collapsible panel support system wherein deployment of the system by rotating support members can be precisely adjusted.

It is yet a further object of the present invention to provide a panel support structure which integrates easily with a roof or roof-like substrate with a minimum mounting or deployment time.

It is again an additional object of the present invention to provide a panel support system having a roof interface that permits deployment of multiple support structures on a wide variety of different roof configurations.

It is still another object of the present invention to provide a roof interface system for a panel support system wherein a wide variety of different sizes and shapes of panel configurations can be accommodated, and easily installed, as well as removed.

It is again a further object of the present invention to provide a panel support system which can easily be attached to support brackets without incurring damage to any of the members of the support system.

It is yet an additional object of the present invention to provide a panel support system that can interface with a roof without the necessity of permanent attachments to the roof.

It is still a further object of the present invention to provide a panel support system which can fit seamlessly to attachment members permanently fixed to a roof.

It is still another object of the present invention to provide a support system for panels or panel-like structures for a wide range of uses, positions, and configurations.

It is again an additional object of the present invention to provide a panel support system which the relative rotation of structural members to deploy the support system is carefully calibrated and controlled without adjusting or tightening at the installation site.

It is still another object of the present invention to provide a panel support system which can be easily fixed to a "hard" mounting system using bolts, without causing damage to structural members of the support system.

It is yet another object of the present invention to provide a panel support system that can be easily deployed or removed by rotating intersecting structural members, without fouling or jamming of the rotation devices.

It is still a further object of the present invention to provide a panel mounting system which is entirely self-contained with its own installation interface.

These and other goals and objects of the present invention are achieved by a method of assembling a support structure constituted by a bi-directional array or frame of intersecting structural members on a roof-like substrate using a substrate interface framework. This substrate interface framework rotatably holds and elevates the bi-directional array. The support structure and substrate interface framework are assembled by first identifying characteristics of a proposed installed configurations of both the array and the framework. This includes any relevant measurements in at least one tilt angle for the bi-directional array with respect to the roof-like substrate. Then, the bi-directional array and interface framework are assembled in accordance with the characteristics of the installed configuration at a separate staging site. Next, the bi-directional array and the substrate interface framework are collapsed into an interconnected, folded package appropriate for transport. The bi-directional array and substrate interface framework are installed according to the characteristics of the proposed installed configuration, using the tilt angle of the proposed installed configuration on the roof-like substrate at the installation site.

Another embodiment of the present invention is directed to a collapsible support system for panel-like structures. The support system has a bi-directional array, i.e. support frame, of intersecting structural members that includes a first group of lower support joists and second group of upper support rails. The lower support joists are rotatably connected to and supported by a substrate interface framework. The collapsible support system further includes bolt connectors that facilitate rotation of the lower support joists with respect to the upper support rails. Also, a pivoting connector at one end of each of the lower support joists is connected approximate to a first end of each longitudinal member of the substrate interface framework.

Yet another embodiment is directed to a collapsible support system for panel-like structures. The support system has a bi-directional array of intersecting structure members including a first group of lower support joists and a second group of upper support rails. The collapsible support system is arranged to be supported by a separate support structure located and fixed at an installation site. The collapsible support system includes through-bolt connectors passing through the lower support joists and into the fixed support structure. A bolt cap plate is arranged over an upper portion of the lower support joists at each of the through-bolt connectors.

BRIEF DESCRIPTION OF THE DRAWINGS

Having generally described the nature of the invention, reference will now be made to the accompanying drawings used to illustrate and describe the preferred embodiments thereof. Further, the aforementioned advantages and others will become apparent to those skilled in this art from the following detailed description of the preferred embodiments when considered in light of these drawings, in which:

FIG. 8 is a cross-sectional perspective view of one embodiment of an upper support rail;

FIG. 9 is an end view of the upper support rail of FIG. 8;

FIG. 10 is a sectional elevation view showing a solar panel mounted between a two-panel clip and a single-panel clip;

FIG. 11 is a sectional elevation view showing a panel being fitted within a gasket of the two-panel clip and arranged to be fitted into a single-panel clip gasket;

FIG. 15 is a side elevation and partial sectional view that shows a support joist and a tubular upper support rail with a two-panel clip;

FIG. 17 is an end view of the a second embodiment upper support rail having a tubular, relatively I-shaped cross-section;

FIGS. 19A and 19B are perspective and cross-sectional views, respectively, of a panel framing clip used with unframed panels;

FIG. 20 is a partial perspective view of the support system of the instant invention depicting unframed solar panels arranged in a column and in spaced relationship thereon, wherein the support system has longitudinal, I-shaped tubular upper support rails;

FIG. 27 is a perspective view of the panel support system holding panels and supported by the roof interface frame;

FIG. 28 is a side view depicting details of the connections between panels, panel support system and the roof interface framework;

FIG. 30A is a top perspective view of one intersection of a lower support joist and an upper rail of the solar panel support system, having a rotation control device and a bolt support cap;

FIG. 30B is a perspective view of the rotation control device; and

FIG. 30C is a perspective view of the bolt support plate.

DESCRIPTION OF THE PREFERRED EMBODIMENTS

Figure 1:
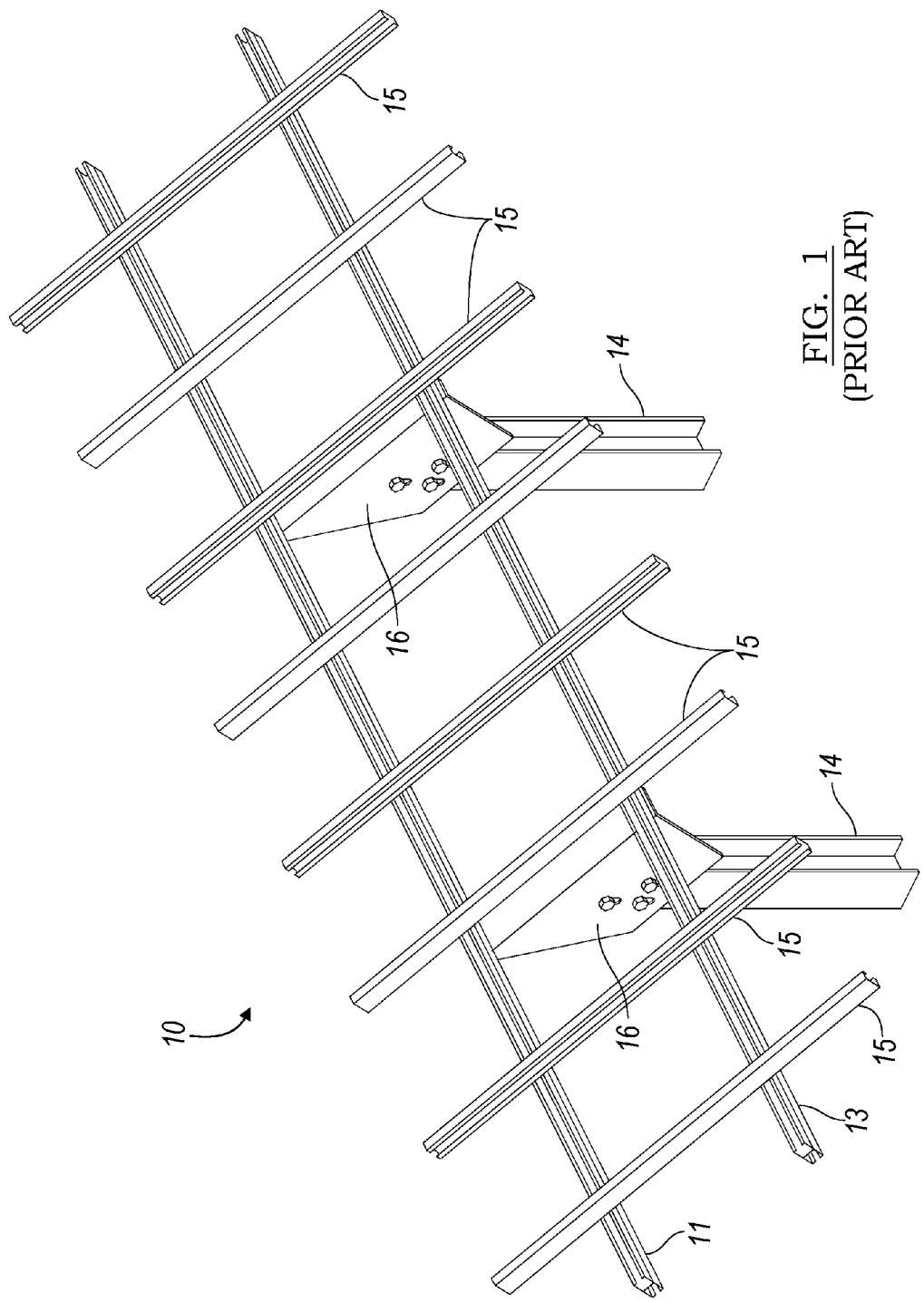
FIG. 1 is a perspective view of an assembled conventional field ground rack support system for securing a plurality of solar panels.

With reference to the drawings, a support system for a photovoltaic array of framed or unframed solar panels 12, 12', respectively, known in the prior art, often includes a free-field ground rack structure having spaced vertical support elements 14 extending from the ground. The support system or structure 10 of FIG. 1 shows only two vertical support elements 14, although multiple support elements may be used to accommodate a longer array of solar panels. Notably, the support system can also be mounted to a roof (or other structure), or tracking unit. Each of the support elements 14, in the case of the free-field ground rack, is preferably an I-beam securely embedded and vertically aligned in the ground, as is well known in the art.

Conventionally, a pair of lower horizontally-aligned, C-shaped support joists 11, 13 is mounted at the upper ends of the support elements 14 by tilt bracket mounts 16. Thus, the vertical support elements 14 are spanned by the support joists 11, 13. When there are additional arrays with additional support elements 14, they can be spanned by multiple joists attached at their ends, or the joists 11, 13 can be longitudinally extended to span all of the support elements 14 in one, unbroken length.

Figure 2:
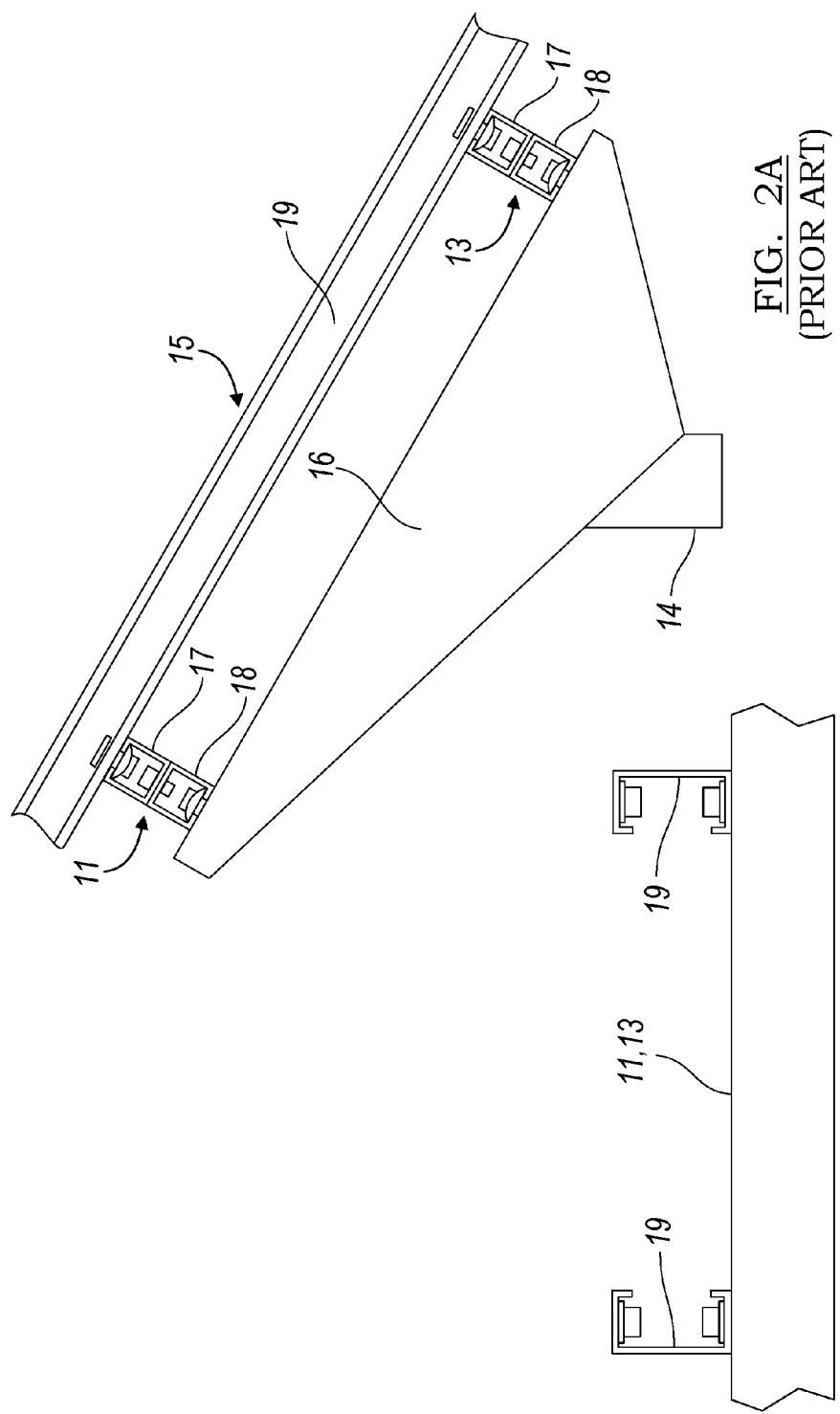
FIG. 2A is a side view of a conventional tilt bracket mount with prior art C-shaped sectional channels secured back-to-back to form support joists to which upper support rails, also shown in FIG. 2B, are secured.
FIG. 2B shows an end view of prior art upper support rails, each with a C-shaped sectional channel.

Upper vertically-aligned rails 15, arranged perpendicular to the support joists 11, 13, are secured to the support joists to produce a two-dimensional span, on which the panels or other panel-like structures are supported. FIG. 2A illustrates conventional support joists 11, 13 secured to tilt bracket mounts 16 by back-to-back channels 17, 18, with each channel having a C-shaped cross-section. Similarly, each conventional upper rail 15 is secured to the lower support joists 11, 13 by bolts through a corresponding wall of its C-channel 19, as best seen in FIG. 2B.

Figure 3:
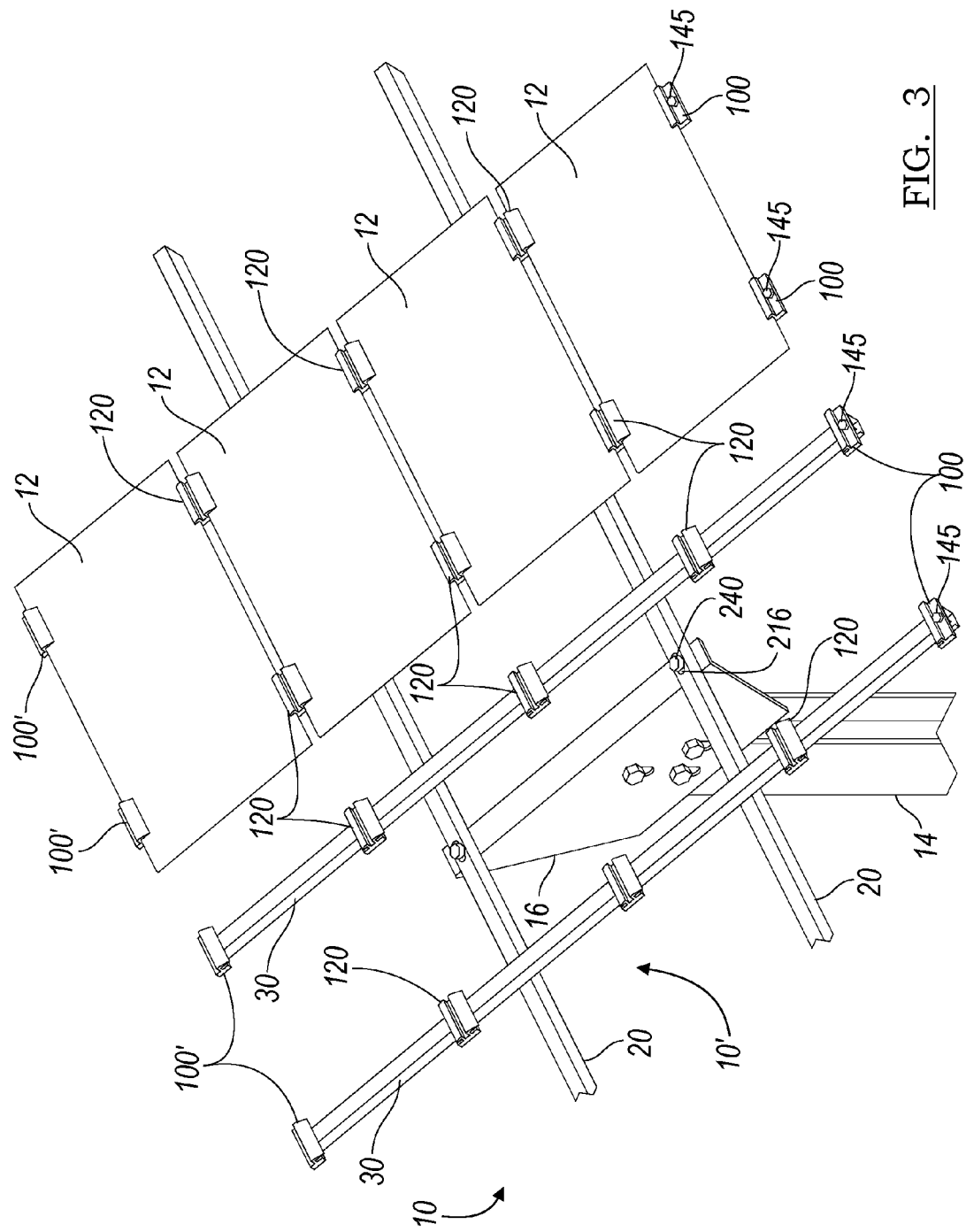
FIG. 3 is a perspective view of a support system of the instant invention showing solar panels arranged in a column and in spaced relationship thereon wherein the support system has horizontally-aligned support joists and (relative thereto) vertically aligned upper support rails.
Figures 4A, 4B:
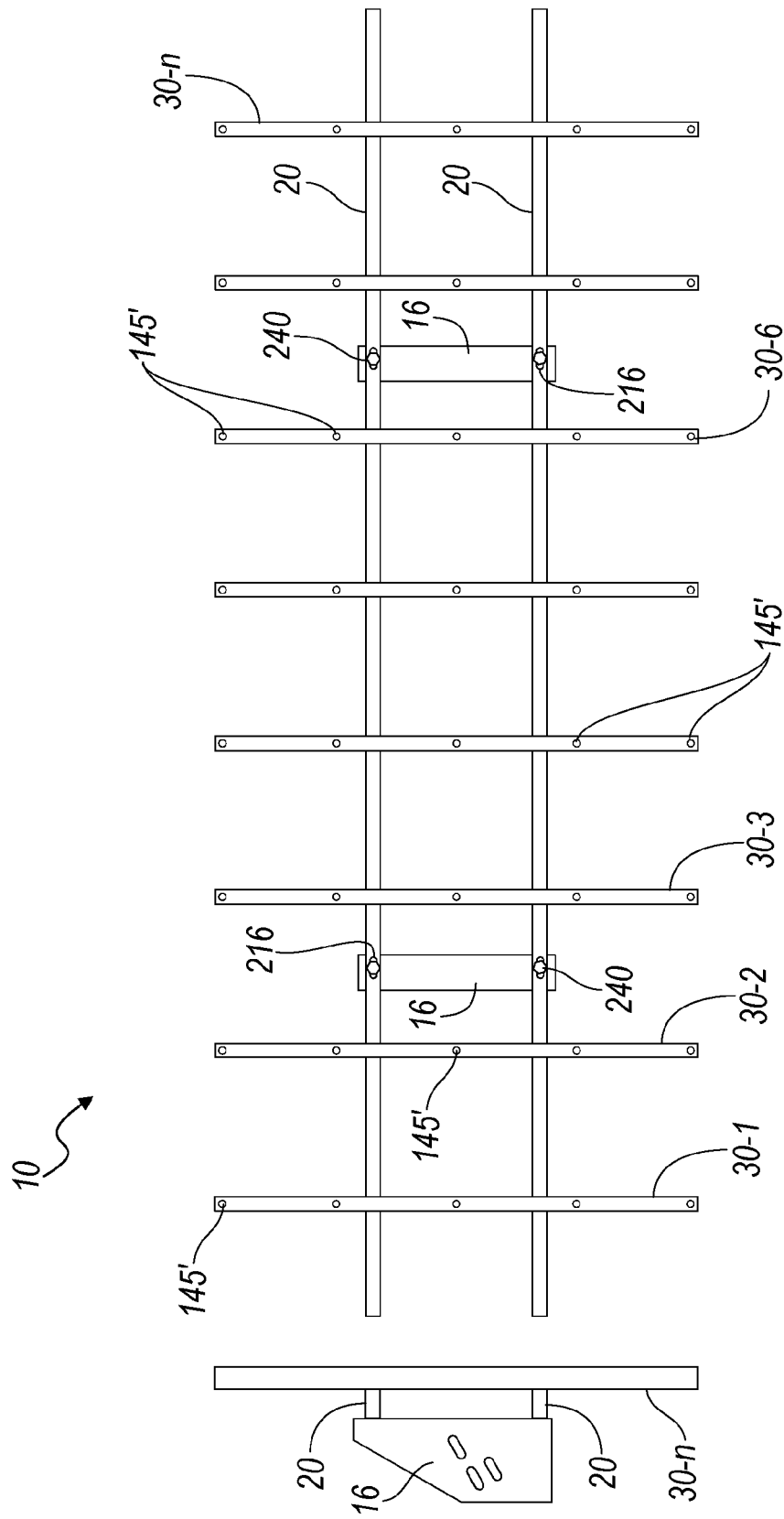
FIG. 4A is a top plan view of the bi-directional span of the assembly of the instant invention in the open position showing vertically-aligned upper support rails attached atop horizontally-aligned support joists.
FIG. 4B is an end elevational view of the bi-directional span of the assembly shown in FIG. 4A.

In accordance with one preferred embodiment of this invention, FIG. 3 depicts a support system 10 for a photovoltaic array of solar panels 12, attached to the same conventional, free-field vertical support elements 14. The support system 10 in this case, however, includes a bi-directional support frame 10' of horizontally-aligned lower support joists 20 and vertically-aligned upper support rails 30-1 through 30-n, as also seen in FIGS. 4A and 4B.

Before proceeding with the description herein, for purposes of fully appreciating the present disclosure of the instant invention, the terminology "horizontally-aligned" refers to structural members that appear to be parallel to the horizon. "Vertically aligned" structural members are perpendicular to the "horizontally-aligned" structural members. However, because the present invention can be mounted on almost any structural support, the terms "horizontally-aligned" and "vertically-aligned" may not best describe certain situations. Accordingly, alternative terminology such as, "longitudinally extending" or "laterally extending" may be used. For example, in FIG. 3, the "horizontally-aligned" structural members are also extended longitudinally while the "vertically-aligned" members extend in a lateral direction. These various terminologies may be used interchangeably as a matter of convenience.

Figures 13A, 13B:
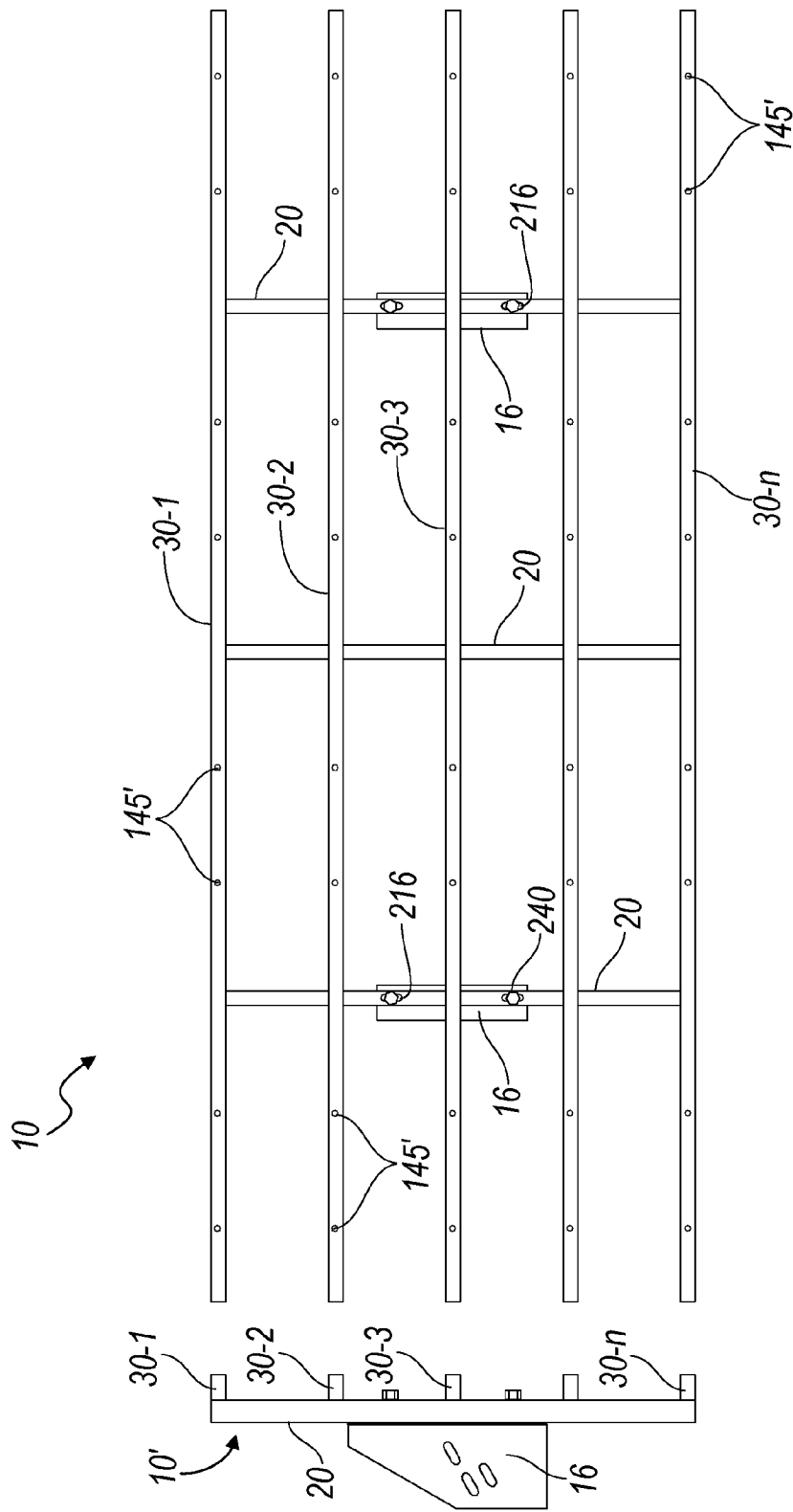
FIG. 13A is a top plan view of the bi-directional span of the assembly of the instant invention in the open position showing upper support rails attached atop lower support joists (i.e., opposite the span shown in FIG. 4A)
FIG. 13B is an end elevational view of the bi-directional span of the assembly shown in FIG. 13A.
Figure 16:
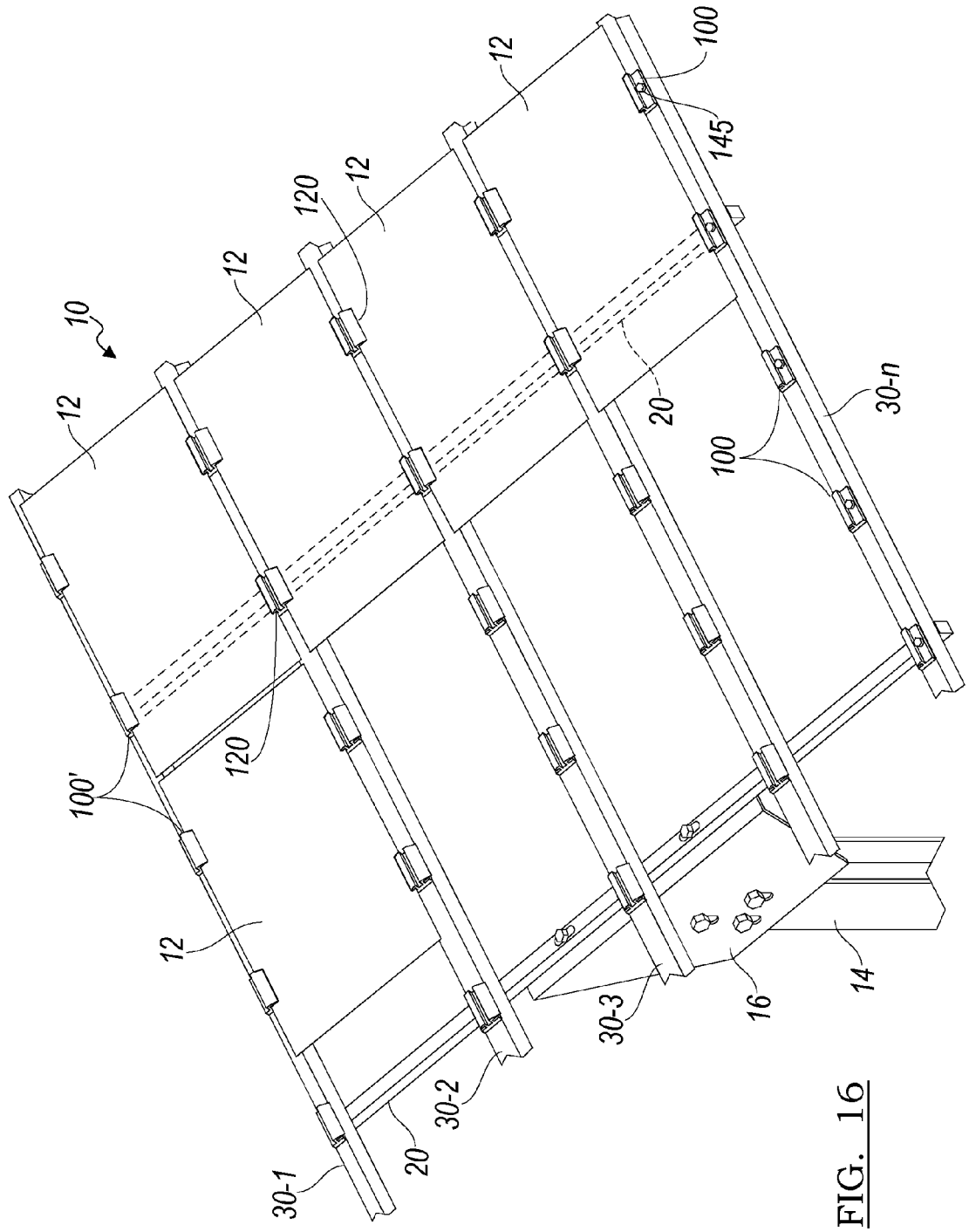
FIG. 16 is a perspective view of the support system similar to FIG. 3 but in this case using vertically-aligned, lower support joists and horizontally-aligned, upper support rails.

As an alternative or second embodiment to the present invention described above, the bi-directional support frame 10' can have the lower support joists 20 aligned along the length of tilting support brackets 16. As a result, upper support rails 30-1 through 30-n extend longitudinally, as seen in FIGS. 13A, 13B and 16. It should be understood that within the context of the present invention, either orientation in any configuration of the substantially perpendicular structural elements (lower support joist 20 and upper support rails 30) can be used. Further, a wide variety of different shapes, sizes and configurations is encompassed by the concept of the present invention and is not to be limited by the examples provided herein. The present invention can be adjusted to conform to any support structure or any "footprint" available for the deployment of solar panels, or any other, panel-like structure to be supported by the present invention.

Preferably, each upper support rail 30-n in this design is a hollow aluminum extrusion. However, in the alternative, the upper support rail may be made of roll-formed steel. In one embodiment, each support rail 30-*n* has a tubular body 31 having a generally rectangular cross-section with an upper wall section 36 and lower wall section 32 defined between spaced side walls 35 as best seen in FIGS. 8 and 9. The upper wall section 36 has a flat top surface 37 and upper wall of varied thickness, preferably having its thickest portion 38 in the center. This thicker center portion 38 is for added strength when fastening the single-panel clips 100, 100' and two-panel clip 120 (described below). Strength can also be achieved for each support rail 30-*n* using a thicker lower wall section 32. The lower wall section 32 includes a longitudinal T-slot sectional channel 33 and, preferably, a longitudinal C-slot sectional channel 34.

Figure 18B:
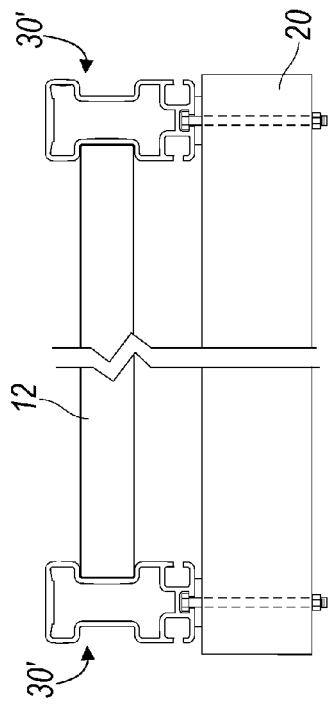
FIGS. 18B and 18C are partial sectional views showing a framed and unframed panel, respectively, fitted within pockets of adjacently spaced I-shaped tubular upper support rails.
Figure 18C:
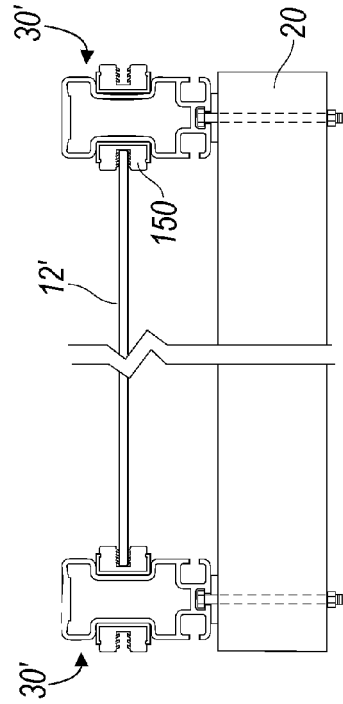
Figure 18A:
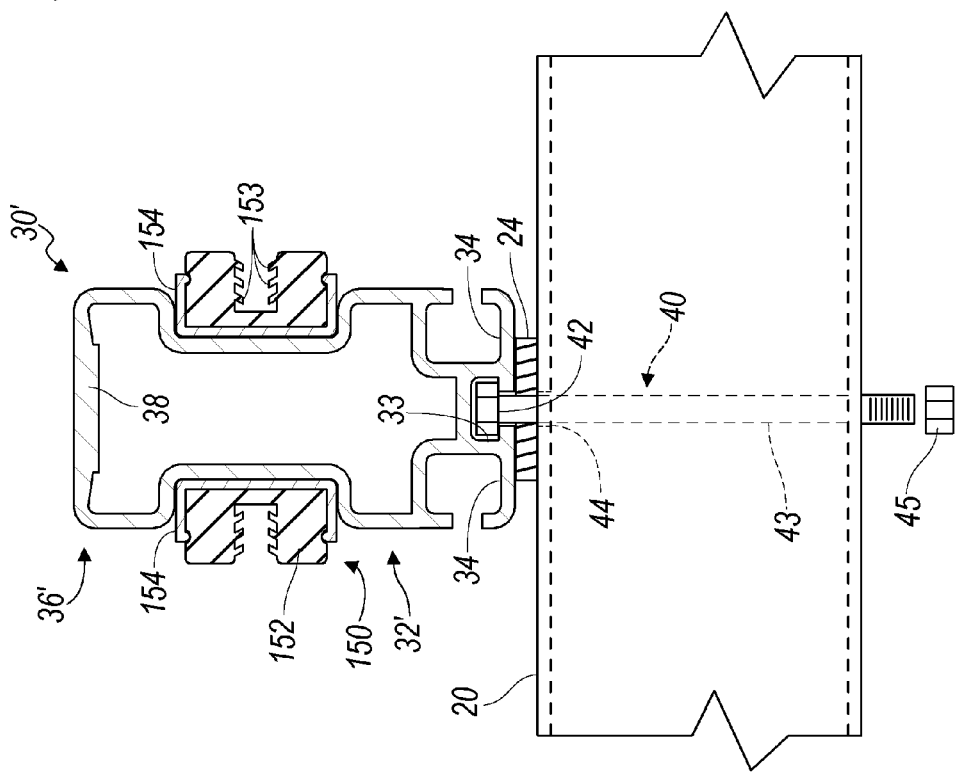
FIG. 18A is a cross-section of the second embodiment of the upper support rail with panel framing clips.

For additional strength and/or flexibility, an alternative (i.e. second) profile of the support rail 30'-*n* shown in FIGS. 17, 18A, 18B and 18C can be used. This profile has an I-shaped cross-sectional tubular body 31' with a flanged upper wall section 36' and a flanged lower wall section 32' forming a pocket 39 therebetween. More specifically, spaced side walls 35' form pockets 39 with the flanged upper and lower wall sections 36', 32', respectively. Like the preferred upper support rail design described above, i.e. rail 30-*n*, the upper wall section 36' of the alternative design has a flat top surface 37 and upper wall of varied thickness, preferably having its thickest portion 38 in the center. The lower wall section 32' includes a longitudinal T-slot sectional channel 33 between two longitudinal C-slot sectional channels 34; one on each side of the T-slot channel. The dual C-slot sectional channels 34 in the second support rail 30'-*n* allows for easier assembly, in that wires can be tucked away on either side of the rail. Notably, the pockets 39 may be used to eliminate clips 100, 100', and/or 120 (described in detail below), i.e. to secure individual solar panels 12 (framed) or 12' (unframed) by sliding the panels therein between adjacent rails 30', as best seen in FIGS. 18B, 18C and 20.

Pockets 39 (and any clips or gaskets held therein) are especially important in that they can be configured to allow the panel (whether framed or unframed) to move therethrough along the length. This capability allows panels or panel-like structures to be slid along the lengths of the upper support rails 30', thereby facilitating a quick and accurate installation of the panels supported by the inventive structural support system. The quick and accurate installation of the solar panels is one of the byproducts, and is a benefit coextensive with those of the present invention (i.e. with the present invention, accuracy is not sacrificed for ease of installation).

Referring again to the preferred embodiment, the spacing between each upper support rail 30 or 30' is governed by the height of the individual solar panels 12, 12' and the number of solar panels per column. Regarding the alternative rail and joist support frame configuration 10' shown in FIGS. 13A and 16, the spacing between each upper support rail 30 or 30' is governed by the width of the individual solar panels 12, and the number of solar panels per row. Each upper support rail 30-1 through 30-*n* or 30'-1 through 30'-*n*, as the case may be, is attached to the lower support joists 20 by bolts 40, wherein the head 42 of each bolt is slideably accommodated in the corresponding T-slot channel 33 of the respective upper support rail. As best seen in FIGS. 6, 7, 15, and 18A-C, the shank 43 of the bolt 40 passes through and is secured to the respective support joist 20 using a nut 45 or other type fastener to form the bi-directional span.

Figure 5A:
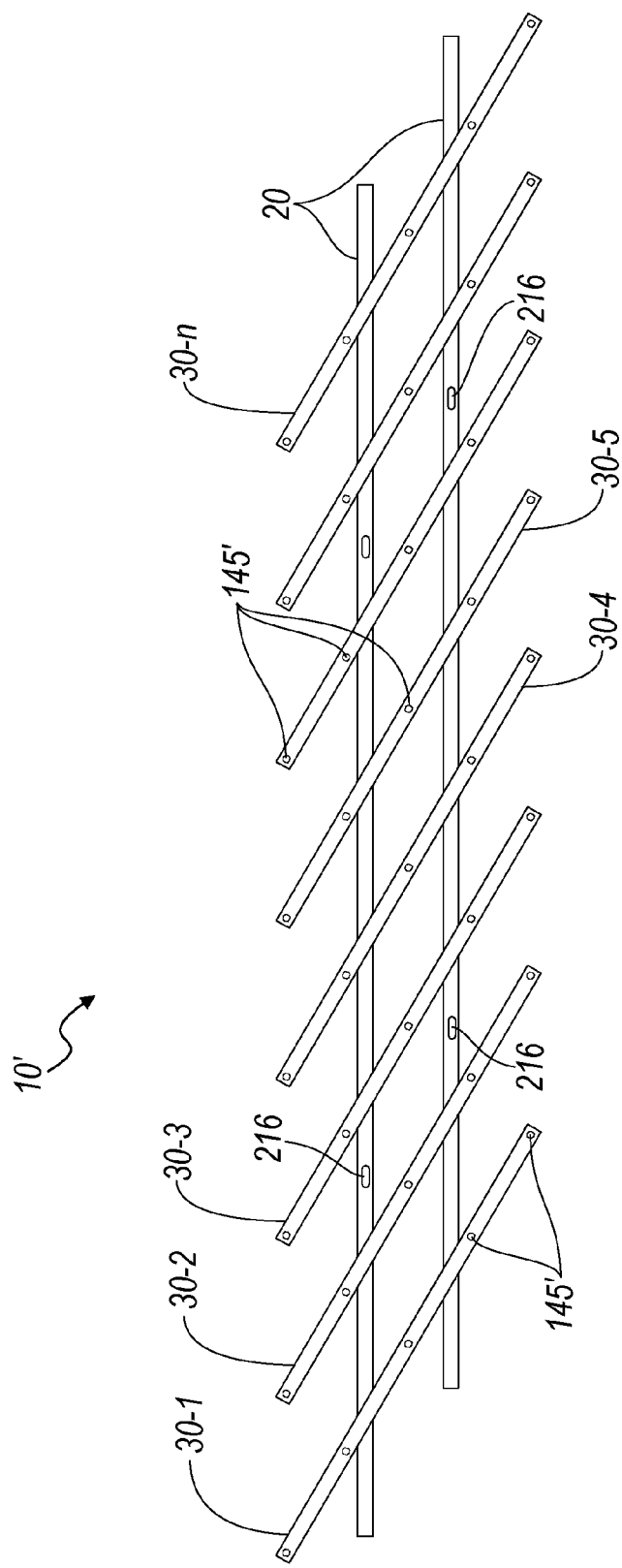
FIG. 5A is a top plan view illustrating the bi-directional support frame of the assembly shown in FIG. 4A collapsed to an intermediate folded position.
Figure 5C:
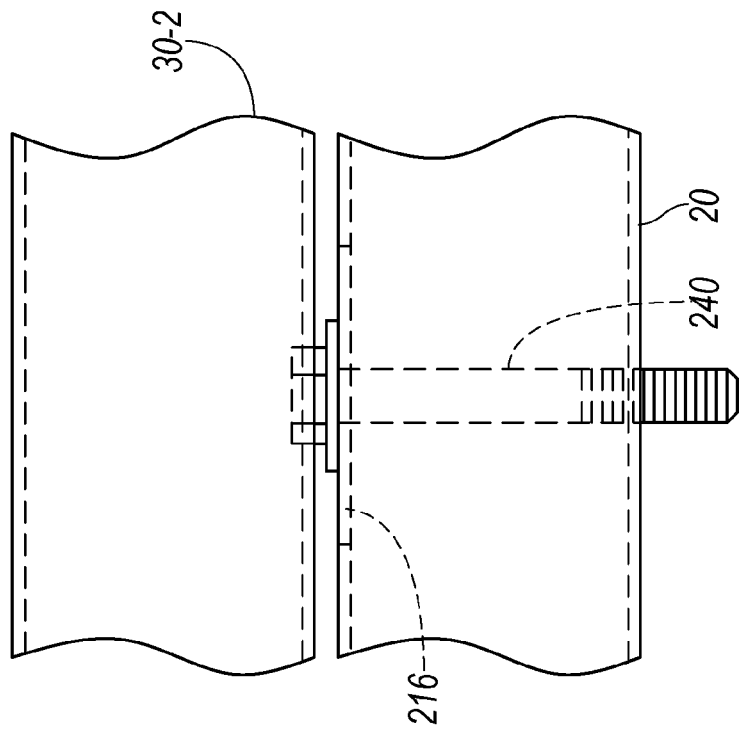
FIG. 5C is a side view of FIG. 5B depicting the connector for holding the support joist to the support and/or tilt bracket or similar structure.
Figure 5B:
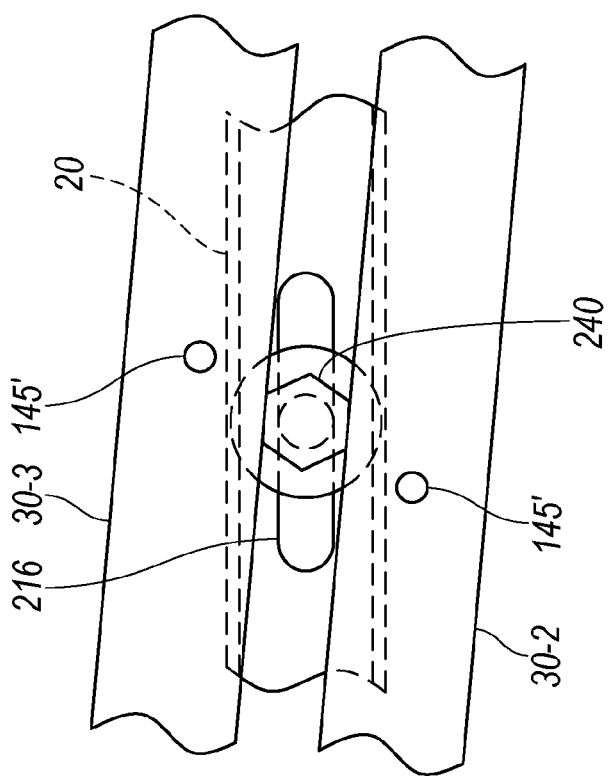
FIG. 5B shows in enlarged detail the support system of the instant invention in a collapsed or folded position, and depicting, in particular, a connector for holding the support joist to a support and/or tilt bracket or similar structure held, i.e. pinched, between adjacent, folded support rails.
Figure 14:
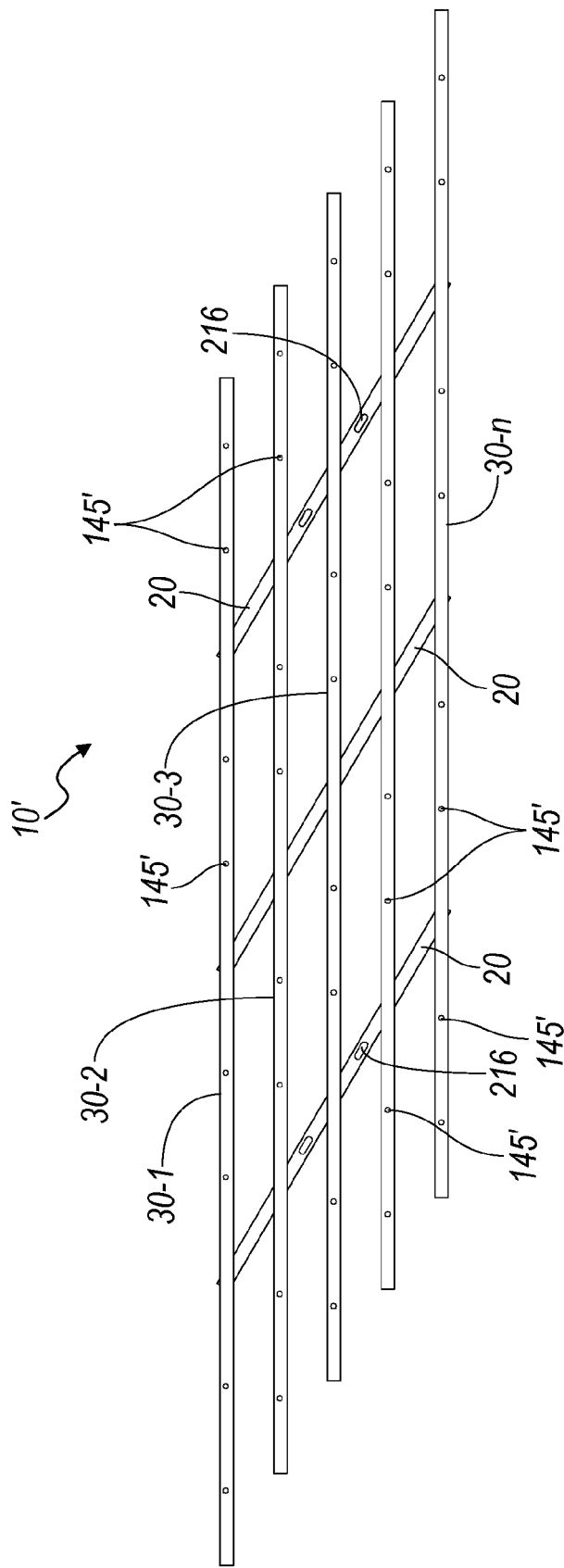
FIG. 14 is a top plan view illustrating the bi-directional support frame of the assembly shown in FIG. 13A collapsed to an intermediate folded position.

Notably, with the nuts 45 and bolts 40 tightened below a predetermined torque value, the bi-directional support frame 10' can be easily folded to reduce space for shipping, as shown in FIGS. 5B and 14. Each support joist 20 is separated from the corresponding upper support rail 30-*n* or 30'-*n* by non-conductive separation washers 24, preferably made of nylon, in order to prevent galvanic interaction between unlike materials. The nylon washer 24 is preferably about $\frac{1}{8}^{th}$ inch thick, although other materials and thicknesses may be used. The use of the nylon washer 24 at the intersection of support joist 20 and a corresponding upper support rail 30 facilitates the rotation of these two elements with respect to each other. Rotation is further facilitated if the nut 45 includes a nylon insert. The nylon insert helps to prevent the nut 45 from loosing during folding and unfolding of the bi-directional span 10'.

Figure 7:
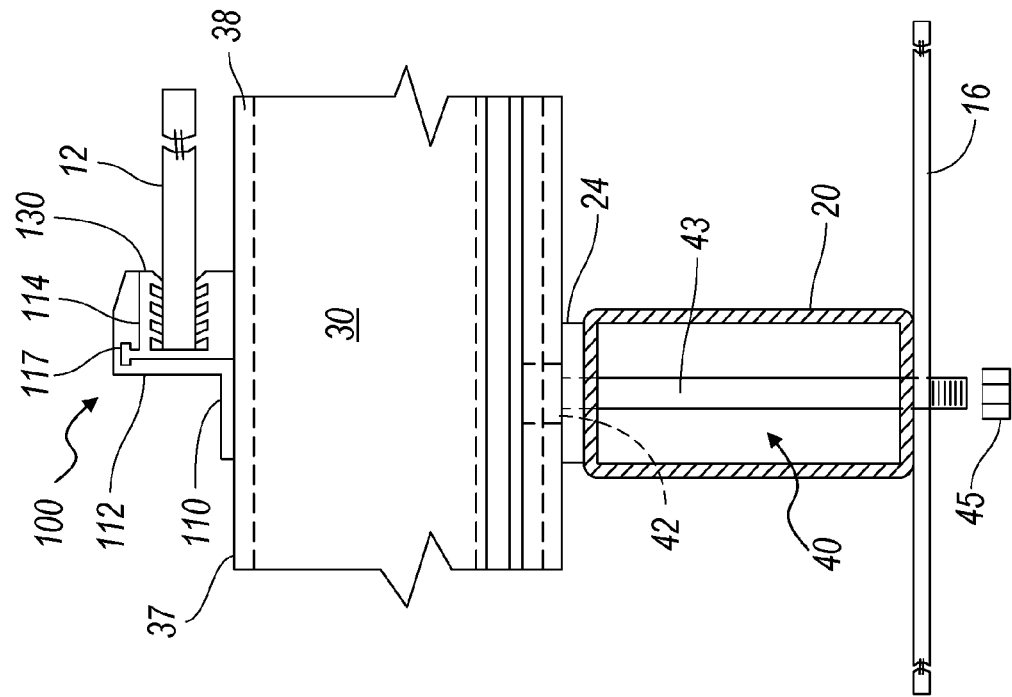
FIG. 7 is an end elevation and partial sectional view perpendicular to that shown in FIG. 6.
Figure 6:
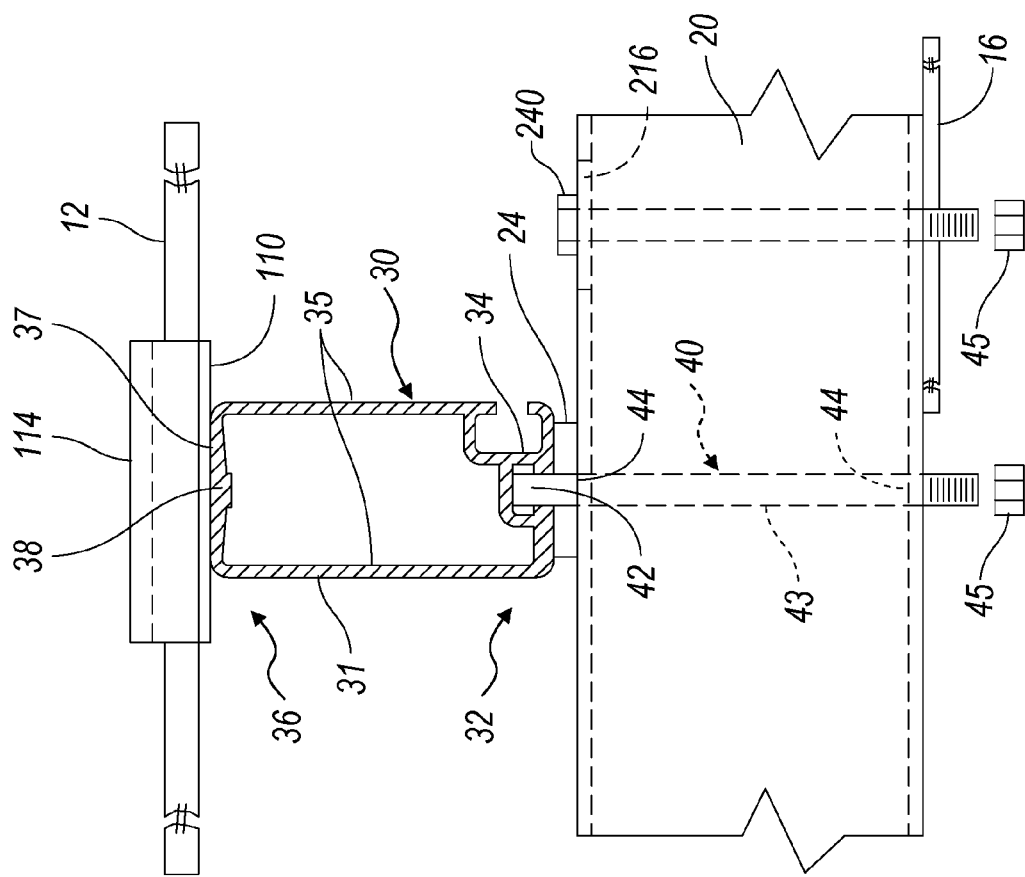
FIG. 6 is a side elevation and partial sectional view that depicts a support joist and a tubular upper support rail with a single-panel clip.

Regarding FIGS. 6, 7 and 15, it is important to notice the small differences between FIGS. 6 and 7, and those of FIG. 15. FIGS. 6 and 7 show the alignment of the holding clip 100 attached to upper support rail 30-*n*, with the length of panel 12, 12' perpendicular the length of support rail 30, as best seen in FIG. 3. FIG. 15 shows the alignment of the holding clip 120 attached to an upper support rail 30-*n*, with the length of panel 12, 12' parallel to the length of support rail 30, best seen in FIG. 16. These two arrangements with different orientations of the length of panel 12, 12' with respect to the length of the upper support rail 30 are illustrative of the flexibility of the present inventive system. This flexibility is facilitated by the various arrangements of the different panel holding clips 100, 100' and 120, as depicted throughout the drawings. The wide range of holding clips 100, 100' and 120 complement the ability of the present invention to provide a very precise pre-arrangement of the inventive support system 10 for easy installation of the panels at the final staging site.

Specifically, once the upper support rails 30 or 30' are secured to the support joists 20, the solar panels (or other panel-like structures) either framed 12 or unframed 12' can be fastened to the rails using friction clips 100, 100' and 120. Notably, as will be discussed in more detail below, upper support rail 30' can also secure framed and unframed panels 12, 12', respectively, in pockets 39 (i.e. using framing clips 150 in the case of unframed panels 12').

Regarding panel clips 100, 100' and 120', as shown in FIGS. 3, 10-12 and 16, at least two types of friction holding clips are preferably used, i.e. end or single-panel clips 100, 100' and an intermediate or two-panel clip 120. The friction holding clips 100, 100', 120 encompass a wide variety of devices that hold or grip panel-like structures using a number of different methods. One is simple gravity. Another is the tightness of or pressure applied by the contact surfaces or arms of the gasket encompassing a portion of the panel-like structure. More specifically, the gasket 130, 131 lining the clip can create spring-like pressure through deformation of the material. One example would be rubber or nylon teeth extending from the arms (described below and identified as teeth 140 for panel holding clips 100, 100', 120 shown in FIGS. 10-12 and teeth 153 for framing clips 150 shown in FIGS. 18A, 19A and 19B). Yet another way to grip the panel is through an adhesive material used with the gasket 130, 131, to develop a bond with the portions of the panel-like structure being held. The gaskets used with holding clips 100, 100', 120 and/or framing clips 150 can be easily changed as needed, depending upon the position of the support structure 10, and the configuration of the panels 12, 12' supported thereby.

The single-panel clips 100, 100' have a generally Z-shaped profile with a base portion 110 and first wall 112. Holding clip 100 has a first flange 114 and uses an unfulcrumed U-shaped gasket 130. Clip 100', on the other hand, has a first flange and gasket that substantially match that of flange 124 and gasket 131 described in detail below with reference to the two-panel holding clip 120.

The two-panel holding clip 120 is generally U-shaped having a first extended flange 114, a second extended flange 124, a first wall 112, second wall 122 and a base portion 110, and uses two different gaskets 130, 131. Generally, both gaskets 130, 131 have a U-shaped cross-section with a fold 138, upper and lower contact surfaces, 132, 134, respectively, with a plurality of ribs 140, i.e. saw-tooth profiles, and a back wall 136.

Figure 12:
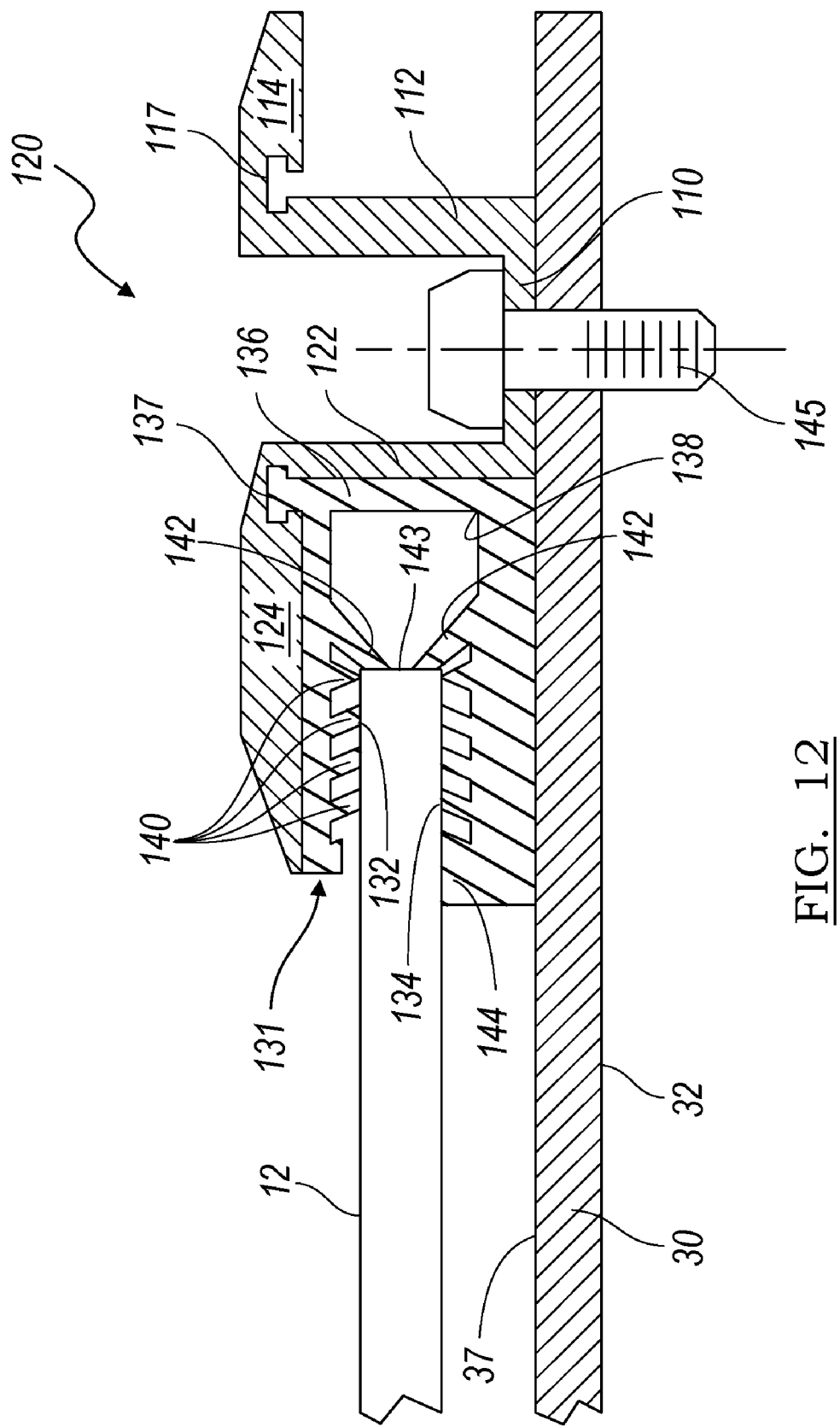
FIG. 12 is a sectional elevation view showing a panel fitted within the gasket of the two-panel clip, having rearmost retaining ribs, a fulcrum ridge and a saw-tooth profile.

The fulcrumed U-shaped clip gasket 131 preferably includes resilient, rearmost retaining ribs 142, designed to contact a top peripheral side 143 of the panel 12, 12' to push and hold the panel downward into the clip below. Notably, there may be one retaining rib 142 extending from the upper contact surface 132 and one extending from the lower contact surface 134 as shown in FIGS. 10 through 12, or, in the alternative, there may be just one large rib extending from either the upper or lower contact surface. Still further, retaining rib 142 may extend from the back wall 136, in which case the retaining rib 142 may be replaced with a spring to provide resiliency.

The lower contact surface 134 of the fulcrumed gasket 131 further includes a fulcrum point 144, i.e. an extended elongated ridge, which forces against the solar panel 12, 12' toward the upper contact surface 132 and second clip flange 124.

In use, the bottom portion of the two-panel clip 120 holds the top peripheral edge of the solar panel 12, 12' therebelow, aligned with the other solar panels in the respective column of panels. As best seen in FIGS. 10 and 11, the bottom portion of clip 120 includes a second clip flange 124, which is longer than the opposing first clip flange 114, which holds the bottom of an uppermost solar panel 12, 12' in the same column. The top or first clip flange 114 of the two-panel clip 120 is preferably the same length as that of the flange of the bottom mounted, single-panel clip 100, i.e. having the same U-shaped unfulcrumed clip gasket 130 used therewith. Preferably, the length of longer clip flange 124 is at least twice the length of the shorter first flange 114, so that the solar panel 12, 12' can be inserted first under flange 124, pivoted on fulcrum point 144 and then inserted under flange 114, whereby flanges 114, 124, gravity, and the resiliency, pressure and friction of the gaskets 130, 131, as described, hold the panel 12, 12' firmly in place once set in position.

The difference between single-panel clips 100 and 100' is that clip 100' is the first clip at the top of each upper support rail 30-n or 30'-n; while clip 100 is the last clip, i.e. at the bottom of each support rail 30-n or 30'-n. Since single-panel clip 100' is the top clip of each upper support rail, it has a fulcrumed U-shaped gasket, identical to the fulcrumed gasket 131, to accommodate its extended flange profile (identical to flange 124). This is necessary since the top single-panel clip 100' forces against the top perimeter side 143 of the uppermost solar panel 12, aligned with the other solar panels in the respective column of panels, to push the bottom edge of the panel 12, 12' into the top portion of the two-panel clip 120 therebelow. Therefore, the profile of clip 100' substantially matches that of the bottom portion of the two-panel clip 120 to fit and secure the top perimeter edge of each solar panel therein.

Both of the clip gaskets 130, 131 preferably include a T-shaped engagement protuberance 137 for slideable registration and attachment via a complementary, somewhat T-shaped retaining groove 117 formed between the walls 112, 122 and their respective flanges 114, 124. Gaskets 130, 131 are used with each clip 100, 100', 120 to protect the front and back peripheral edges of each solar panel 12. Each gasket 130, 132 is preferably extruded with the T-shaped mounting protuberance 137.

Preferably, the panel holding clip gaskets 130, 131 and framing clip gaskets 152 are made of a material that is physically and chemically stable, and preferably electrically nonconductive. Furthermore, the gaskets 130, 131, 152 should be of an electrically resistant material and have good elasticity upon compression. Suitable materials, which can be employed include, but are not limited to, neoprene, butyl rubber, ethylene-propylene diene monomer (EPDM), chlorinated polyethylene (CPE) and a polytetrafluoroethylene (PTFE) material such as GORTEX® (a trademark of W.L. Gore & Associates, Inc.) or TEFLON® (a trademark of E.I. DuPont de Nemours & Company).

It is important to describe in more detail at this point, an additional structural benefit of support rails 30'. With reference to FIGS. 17 through 20, longitudinal pockets 39 of rails 30' can be used as an alternative method for conveniently securing panels 12, 12' to the bi-directional support frame 10' of assembly 10. Using framing clips 150 spaced along each panel's peripheral side 143 of unframed panels 12', or simply using the frame of the framed panels 12, each panel can be inserted and slid in place along the longitudinal pockets 39 of adjacent rails 30' as best seen in FIGS. 18B (for framed panels 12) and 18C (for unframed panels 12'). Preferably, panels 12, 12' are slid in place and stacked in columns using the joist and rail orientation shown in FIG. 4A. However, panels 12, 12' may be aligned in rows using the joist and rail orientation shown in FIG. 13A. End caps and/or extended finger stops (not shown) are used at the end of the rails 30' to secure the panels within the corresponding columns or rows.

Regarding the framing clip 150 for unframed panels 12', each framing clip 150 preferably includes a clip bracket 154 fitted with the gasket 152 (engaged via bracket flange 155 and gasket groove 156), as best seen in FIGS. 19A and 19B. The gasket 152 further includes ribs 153 much like those of ribs 140 (discussed above with reference to panel clips 100, 100' and 120).

Spacers 159 are preferably used to maintain appropriate spacing between adjacent panels in columns or rows, as shown, for example, in FIG. 20. The spacers 159 can be constituted by fixed back-to-back framing clips 150 or slightly modified two-panel holding clips 120, i.e. without the base portion 110 for bolt attachment and with a bottom flange. However, any other type of appropriate structure can be used. The spacers 159 are important since the movement permitted by the holding clips 100, 100', and 120 or by movement in longitudinal pockets 39 may otherwise permit solar panels 12, 12' to become misaligned with respect to each other.

Most notably, the support system 10 of this invention allows for off-site assembly (at a convenient staging site) to precise engineering specifications, in that, once the support members are assembled, the bi-directional span can be folded or collapsed on itself, as shown with reference to FIGS. 5 and 14, and then easily transported to the installation site. The support system 10 is then positioned, and secured to the free-field ground rack, tracking unit, or other substrate via the tilt bracket 16 (or equivalent structure) while still in the folded position. More specifically, after attaching one support joist 20 to one of the brackets 16, using a pair of tilt bracket attachment bolts 240 (wedged between adjacent rails 30-2 and 30-3 in the folded position, as shown in FIGS. 5B and 5C) the bi-directional support frame 10' is unfolded to the position of FIG. 4A or 13A, and the other support joist 20 is attached to the second bracket 16, via a second pair of tilt bracket bolts 240. Of course, the same procedure is followed if rails 30' are used in place of rails 30.

The method of assembling the inventive support system 10 for an array of photovoltaic panels 12, 12' in columns and rows, includes the steps of building the bi-directional support frame 10' by attaching support members, i.e. support joists 20 and upper support rails 30-n or 30'-n, using a plurality of attachment bolts 40 and nuts 45. The top surface 37 of each upper support rail 30-n or 30'-n must be unobstructed for the solar panels 12, 12' to be secure against. As previously described, each upper support rail 30-n or 30'-n has a substantial rectangular cross-sectional portion or an I-shaped cross-sectional portion, respectively. Preferably, upper support rail 30, 30' has an upper wall section 36, 36' and lower wall section 32, 32', as previously described.

Each individual support system 10 can be easily engineered, fabricated, assembled and adjusted to various specifications. For example, the longitudinal T-shaped sectional channel 33 in the lower wall section 32, 32' is adapted to adjustably receive the heads 42 of attachment bolts 40. Bolts 40 attach each upper support rail 30-n, 30'-n passing through one of the lower support joists 20. The T-shaped slotted channel 33 permits the bolt 40 to be placed at any location along the length of the channel and through the lower support joist 20 as shown in FIGS. 6 and 7 (for a first orientation of the support joist assembly shown in FIG. 4) and FIG. 15 (for the second orientation of the support joist assembly shown in FIG. 16). Notably, FIGS. 18A through 18C can be considered to show attachment of rails 30' to joist 20 in either orientation.

Further, regarding holding clips 100, 100', 120, each clip can be pre-positioned and attached to the upper wall section 36, 36' of the upper support rails 30, 30', respectively, by a self-threading bolt 145 secured to thick portion 38 (via hole 145') and whose head engages base portion 110 of the clip. The perimeter holding clips 100, 100', 120 can be positioned and attached to the upper wall section 36, 36' of the upper support rails 30, 30' off-site to adhere to the proper engineering specifications for a specific installation. The positioning and necessary spacing for the columns and rows of the photovoltaic panels 12, 12' of the array can be optimally and easily made off-site during fabrication, without wasting space, time and materials.

Once the perimeter holding clips 100, 100', 120 and upper support rails 30-n or 30'-n are attached to the support joists 20 as described above, the bi-directional support frame 10' of the support system 10 can be reduced in size by folding the upper support rails 30, 30' relative to the support joists 20. The folded span can be easily shipped to the location for final installation, then unfolded and secured to the roof (as described below), free-field ground rack or tracking unit (as described above), or other substrate for attachment of the photovoltaic panels 12, 12' via the pre-positioned, attached and properly spaced perimeter holding clips 100, 100', 120 (as shown in FIGS. 3 and 16) or framing clips 150 and spacers 159 (shown in FIGS. 18B, 18C and 20).

Regarding final installation to vertical, free-field ground supports 14, one preferred method to assemble the support system 10 is to align a first support joist 20 over tilt support bracket(s) 16 (or similar support structures), and to bolt the support joist 20 to the support bracket(s) 16 using bolts 240 secured within the folded structure, as shown in FIGS. 5B and 5C and previously discussed. Depending on the joist 20 to rail 30, 30' orientation, i.e. either that shown in FIG. 4A or 13A, the aligned support joist 20 will be attached first to one or two brackets. Connection is made to the tilt support bracket(s) 16 before anything else is done. Once connection is made, the bi-directional support frame 10' is unfolded sufficiently to allow a second support joist to be laid over the tilting support bracket(s) 16 so that the connection process can be repeated. It is important that the support joist 20 be provided with slots 216 (as depicted in FIGS. 3, 4A, 5B and/or 14) in order to facilitate on-site adjustment. It is also preferred that all of the routed or punched slots 216 be carefully made during the fabrication operation before a support structure 10 is shipped to the permanent installation site. The alignments in which support joist 20 are laid across two or more tilting support brackets 16 are best depicted in FIGS. 3 and 16. Once two support joists 20 are attached to their respective tilt brackets 16 (or similar structures), then the entirety of the support system 10 is ready for permanent attachment of the panels 12, 12'.

Notably, with the aforementioned connections made to the tilt brackets 16 (or some other framing support), installation of the overall support structure 10 is relatively simple Very little technical skill is needed for this operation, and nominal measurement or alignment is required since the overall support structure 10 was pre-engineered, fabricated and pre-assembled (at least partially) off-site. This ease of installation, while maintaining engineering specifications and measurements, is one of many major advantages of the present invention.

This important advantage of pre-engineering, fabrication and assembly conducted off-site at a plant or other convenient fabrication area, includes the precise measurements needed to place and drill or punch the connection holes 44 for proper alignment of the lower support joist 20 and upper support rails 30, 30'. More specifically, with reference to the joist-to-rail orientation shown in FIG. 4A, in the assembly process, the support joists 20 are aligned to the position at which they will be connected in the field to the tilt bracket 16 for a free-field ground rack or roof interface frame (described below). Next, connections are made between the first support joist 20 and the first upper support rail 30, 30' by inserting a bolt 40 in spaced, pre-drilled holes 44 passing through the support joist 20 with the bolt head 42 at the top of the support joist and a hex nut 45 at the bottom. A nylon separation washer 24 is included near each bolt head. The process is repeated for the other horizontal support joist(s) 20. Next, a single upper support rail, i.e. either 30-1 or 30'-1, is aligned with the head 42 of the first bolt 40 located in position along the first lower support joist 20. The bolt head 42 is lifted, separated from the separation washer 24, and slid into the T-slot channel 33 in the upper support rail 30 or 30'. This step is then repeated for the other lower support joist(s) 20. The end of the first upper support rail 30-1 or 30'-1 is then aligned with a side wall of the first lower support joist 20, and the hex nuts 45 are torque snug to a predetermined torque value that permits rotation between joist 20 and upper rail 30, 30'. Using a machinist square, the horizontal support joist 20 is made perpendicular to the vertical support rail 30-1 or 30'-1. The other vertical rails 30-2 through 30-n or 30'-2 through 30'-n are assembled and secured in like fashion. Additionally, to reduce cost and/or to more conveniently tuck wires between rows and columns, it should be noted that support rails 30 may be alternately or intermittently arranged with support rails 30' in the same assembly.

Of course, the method for assembling the bi-directional support frame 10' having the second orientation, i.e. FIG. 13A, of support joists 20, is substantially the same as that described above for support joists oriented according to FIG. 4A. A first lower support joist 20 is aligned and bolts 40 are inserted in spaced, pre-drilled holes 44 passing through the lower support joist 20, with the bolt head 42 at the top of the joist and a hex nut 45 at the bottom. Again, the separation washer 24 is included near each bolt head. The process is repeated for the second and any subsequent vertical support joists 20. Next, a single upper support rail 30, i.e. using either cross-sectional design 30 or 30', is aligned with the head 42 of the first bolt 40 located in position along the first lower support joist 20. The bolt head 42 is lifted, separated from the separation washer 24, and slid into the T-slot channel 33. This step is repeated for all subsequent, lower support joists 20. Using a machinist square, the lower support joists 20 are made perpendicular to the upper support rails 30 or 30' (i.e. the upper support rail 30-1 or 30'-1 is aligned perpendicular with a side wall of each lower support joist 20), and all hex nuts 45 are torque to a predetermined value permitting rotation of joist and rail while maintaining the precise, intersecting position therebetween. The other rails 30-2 through 30-*n* or 30'-2 through 30'-*n* are then assembled and secured in like fashion.

As previously stated, bolts 40 and hex nuts 45 are used to securely fasten the lower support joists 20, as the case may be, to the corresponding upper support rails 30, 30'. As stated above, each hex nut 45 preferably includes a nylon insert. The nylon insert retains torque pressure of the fastener (at the predetermined value) during shipping and prevents the support rails 30 and/or 30' from loosening from the support joists 20 when folded and unfolded. Notably, on account of the separation washers 24 and the nylon hex nuts 45, the upper rails 30, 30' can pivot relative to the support joists 20 without any significant loosening. The assembled bi-directional support frame 10' can be folded and unfolded by grasping the ends of two adjacent support joists, and pushing one of the lower support joists 20 longitudinally away relative to the second support joist 20, permitting the assembly to fold into a compacted form for shipping. Alternatively, the folding operation can be made just as easily by grasping the ends of two adjacent horizontal rails 30, 30' and pushing one longitudinally away relative to the other.

It is important to note for assembly and shipping purposes, that the tubular body forms 31, 31', having varied wall thickness 38, and channels 33, 34, substantially reduces the weight of the overall support rails 30-*n* or 30'-*n*, and, therefore, the overall weight of the assembled system in comparison to the prior art. Yet, because of the aforementioned selective reinforcement, the structural strength is enhanced.

As previously stated, the support structure 10 of the present invention facilitates simple and quick installation. After shipping the structure assembly 10 to the field for permanent installation, it is unpackaged and, in the case of a free-field ground rack, the appropriate lower support joist 20 is aligned and secured to one or both of the vertical support elements 14, via the bottom attachment openings in the tilt bracket mounts 16, depending on the joist-to-rail orientation. For example, in the case of the support frame 10' having the orientation of support joists 20 as shown in FIG. 13A, either the right or left outside-most lower support joist 20 is aligned parallel, mounted and secured to the corresponding vertical support element 14, via the tilt bracket mounts 16. Then, the other outside-most lower support joist 20 is pushed to unfold and realign mutually parallel to the first support joist, i.e. perpendicular to the upper support rails 30, 30', so as to align mutually parallel to the other tilt bracket. The assembly 10 is securely fixed via the top attachment openings 216 in the corresponding support joists 20 to the tilt bracket mounts 16 using bracket attachment bolts 240 as previously described.

Notably, the space between adjacent support joists 20 can be adjusted (if needed) by sliding the joists along the rails via their T-slot channels, so that the spacing of the joists 20 precisely align with and attach to the tilt bracket mounts 16. In contrast, it is not possible to easily adjust the space between the joists 11, 13 in the conventional design shown in FIGS. 1, 2A and 2B along its several conventional rails 15, since the spacing therebetween is fixed by the drilled bolt holes made in rails 15 through the side wall of channels 19.

Once the assembly of this invention is unfolded and the support joists 20 are secured to, in this example, the tilt bracket mounts 16 of a free-field ground structure, the spacing and perpendicular relationship of the upper support rails 30 are checked relative to the side wall of the lower support joists 20 using a machinist square or similar setup fixture and adjusted if needed. The hex nuts 45 are also checked to assure that they continue to be snug after shipping and installation.

And finally, with the expanded bi-directional support frame 10' properly positioned and secured to the support elements 14, each solar panel 12, 12' is fixed in place by sliding into rows or columns via the longitudinal pockets 39 (with reference to rails 30') or by using top perimeter clips 100, 100' or 120 (i.e. inserting the top of the panel into its top perimeter clip 100' or 120, then pivoted about the respective gasket fulcrums 144, to fit the panel's bottom edge into corresponding bottom perimeter gravity clips 100, 120, as best seen in FIGS. 10 through 12). To finish the installation, wires are tucked away in the corresponding C-shaped slotted channels 34. The proper spacing between panels is maintained by spacers 159, as depicted in FIG. 20.

The above discussion primarily describes deploying solar panels in the field by attachment to tilt brackets 16 fixed to freestanding support elements 14 of a ground rack as depicted in FIGS. 1, 3, 4B, 13B, 16. It is also common to deploy solar panels on flat roofs. Like the ground rack structure, solar panels are best deployed at some angle to the horizontal to better absorb solar energy. This tilt was provided by support elements 14, 16. However, these cannot easily be placed on most roofs, whether flat or sloped. Sloped roofs are generally not addressed in this application, due to well-known limitations which are not necessary for a discussion of the present invention.

Rather, flat roofs are the selected mounting substrate for this further embodiment of the present invention, depicted in FIGS. 21 through 29. Flat roofs are sufficiently common and expansive so that substantial numbers of solar panel arrays can be mounted thereon. Flat roofs are the type most common on large buildings, and are usually of a structural strength that will support the weight of substantial solar panel arrays. However, the free-field ground rack structure, using support elements 14, 16 of support assembly 10 (shown in FIGS. 1-4B, 13A, 13B and 16), is largely inappropriate for mounting on a flat roof. Yet, many of the other features of this invention described above are appropriate.

Figure 23:
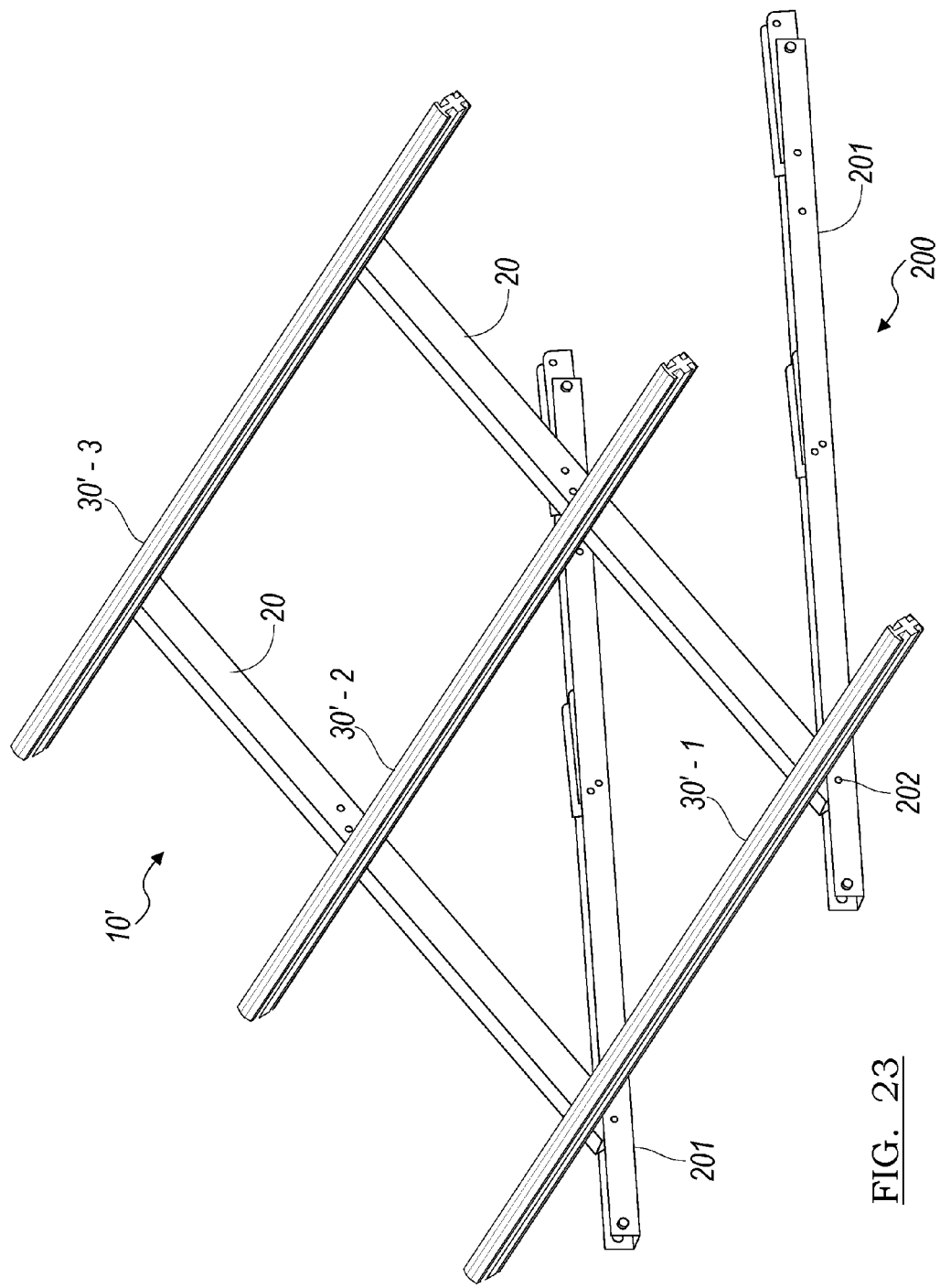
FIG. 23 is a perspective view of the panel support system tilted upwards from the roof interface framework.

Accordingly, a roof interface framework 200 is preferably used to hold the support structure 10 to a relatively flat roof or roof-like substrate (not shown). The bi-directional support frame 10' of intersecting structural members, i.e. the pivotally connected first group of lower support joists and second group of upper support rails (as described above), is attached to the roof interface framework 200 at one end by pivoting connecters 202 to form support structure 10 as shown in FIG. 23. This allows the bi-directional, panel support frame 10' of structure 10 to be tilted upward to a desired angle, maximizing solar exposure on panels 12, best seen in FIG. 26. The tilting of panels 12, 12' by means of the framing of panel support structure 10 on roof interface framework 200, not only serves to maximize panel solar exposure, but also keeps the panels 12, 12' from accumulating dirt and atmospheric debris, which will be considerable if the panels were constantly laid flat on the roof substrate.

The roof interface framework 200 is designed primarily for flat roofs. However, with proper adaptations and connections, interface framework 200 can be used on sloped roofs or other irregular roofs. Likewise, interface framework 200 can also be used on the ground. For example, the interface framework 200 can also be used on concrete or other artificial surfaces and substrates. If the ground is sloped, additional connector adaptations will be required to secure the interface framework 200 thereto.

For purposes of illustrating the most common proposed use of the interface framework 200, the example of flat roofs is considered. This is one of simpler applications of interface framework 200 since no special connections are needed between the interface and the roof or roof-like substrate. Rather, the distributed weight of the combined interface framework 200, bi-directional span support frame 10' of assembled structure 10 and panels 12 will be sufficient to hold the overall arrangement securely to the subject flat roof.

FIG. 23 depicts the basic relationship between bi-directional panel support frame 10' and roof interface framework 200 of system 10. The roof interface framework 200 is constituted by two longitudinal members 201, preferably formed by U-shaped channels. The U-shaped channels 201 provide space into which other structures, such as the end of lower support joists 20 can be inserted. The ends of lower support joists 20 are shown as being inserted into the U-shaped channels of main longitudinal members 201. Panel support frame of structure 10 is rotatably held to the roof interface framework 200 by means of pivoting connectors 202. This arrangement allows the rigid structure of the support assembly 10 to be uniformly tilted upward from the substrate (not shown) which supports the roof interface framework 200.

The tilting operation of the panel support structure 10, i.e. combined bi-directional panel support frame 10' and roof interface framework 200, is crucial to this embodiment of the present invention. As previously indicated, the tilting function is important to help maximize solar exposure and avoid debris accumulation. Further, the tilting function is particularly important to facilitate installation, maintenance and/or removal of panels 12, 12'. This is especially crucial under circumstances where multiple support assemblies 10 are arranged adjacent to each other. By tilting the bi-directional panel support frame 10' of support assembly 10, the panels on adjacent assemblies can be shifted so that they will not interfere with each other. As a result, the panels can be easily installed or removed without having to adjust adjacent panel arrays.

The pivoting connector 202 can be any type of pivoting structure, such as a bolt, held by conventional nuts or similar structures. The ends of lower support joists 20 fit into the U-shaped channel of longitudinal member 201 and are joined thereto by the pivot structure 202. When panel support assembly 10 is positioned without any sort of tilt, lower support joists 20 would appear to fit into the U-shaped channel of longitudinal member 201. However, there are other structures contained within the U-shaped channel of longitudinal member 201 that preclude the complete fit of lower support joists 20 within the U-shaped channels.

Figure 24:
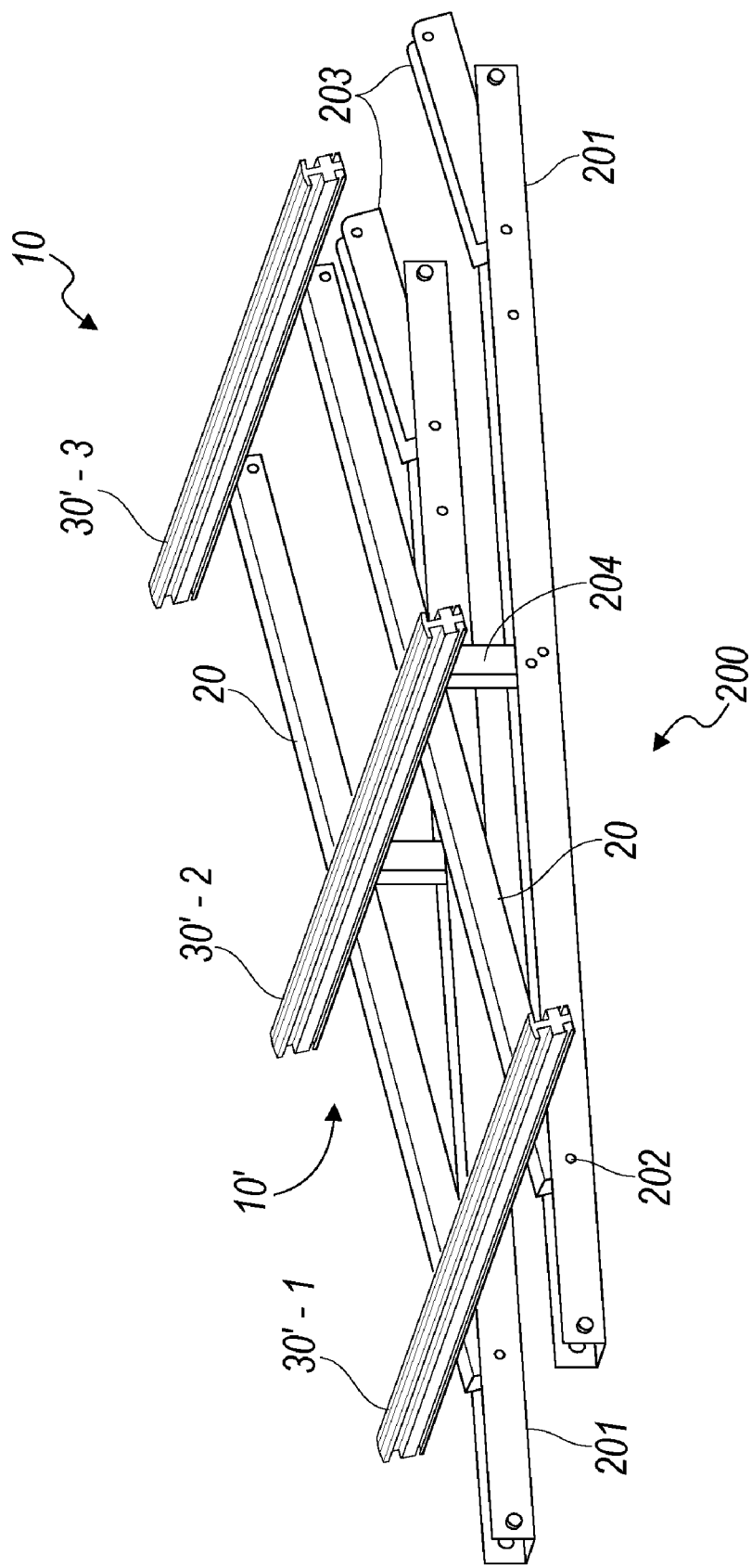
FIG. 24 is a side perspective view depicting both the panel support system and the roof interface framework partially assembled.

In particular, with reference to FIG. 24 the depicted embodiment of the present invention includes two sets of pivoting vertical supports 203 and 204. Both sets or pairs of pivoting vertical supports 203, 204 pivot upwards from the U-shaped channels of their main respective longitudinal members 201. Both sets of pivoting vertical supports are sized so as to hold the panel support frame of assembly 10 (constituted by upper support rails 30' and pivotally intersecting lower support joists 20) at a predetermined angle of tilt with respect to the roof interface framework 200 and subsequently the substrate (not shown). It should be understood that different lengths of the pivoting vertical supports 203, 204 can be used to achieve different angles of tilt for the panel support assembly 10.

The pivoting vertical support pairs 203, 204 are connected to their respective U-shaped channel of main longitudinal member 201 through the use of simple bolts, or any other structure that permits the easy pivoting of the vertical support pairs 203, 204. The pivoting connecting structures 2031, 2041 can be arranged so that they are easily removable, permitting the use of different lengths of vertical support pairs 203, 204 to be used to achieve different tilt angles. The pivoting connectors 2031, 2041 for the intermediate vertical support pair 204 and the major vertical support pair 203 are generally of the same type of bolt structure (designated 2041 and 2031, respectively). In order to interface with lower support joists 20, additional pivoting connecting structures 2032 and 2042 are used to connect the distal ends of vertical support pairs 203, 204 and lower support joists 20.

Figure 25:
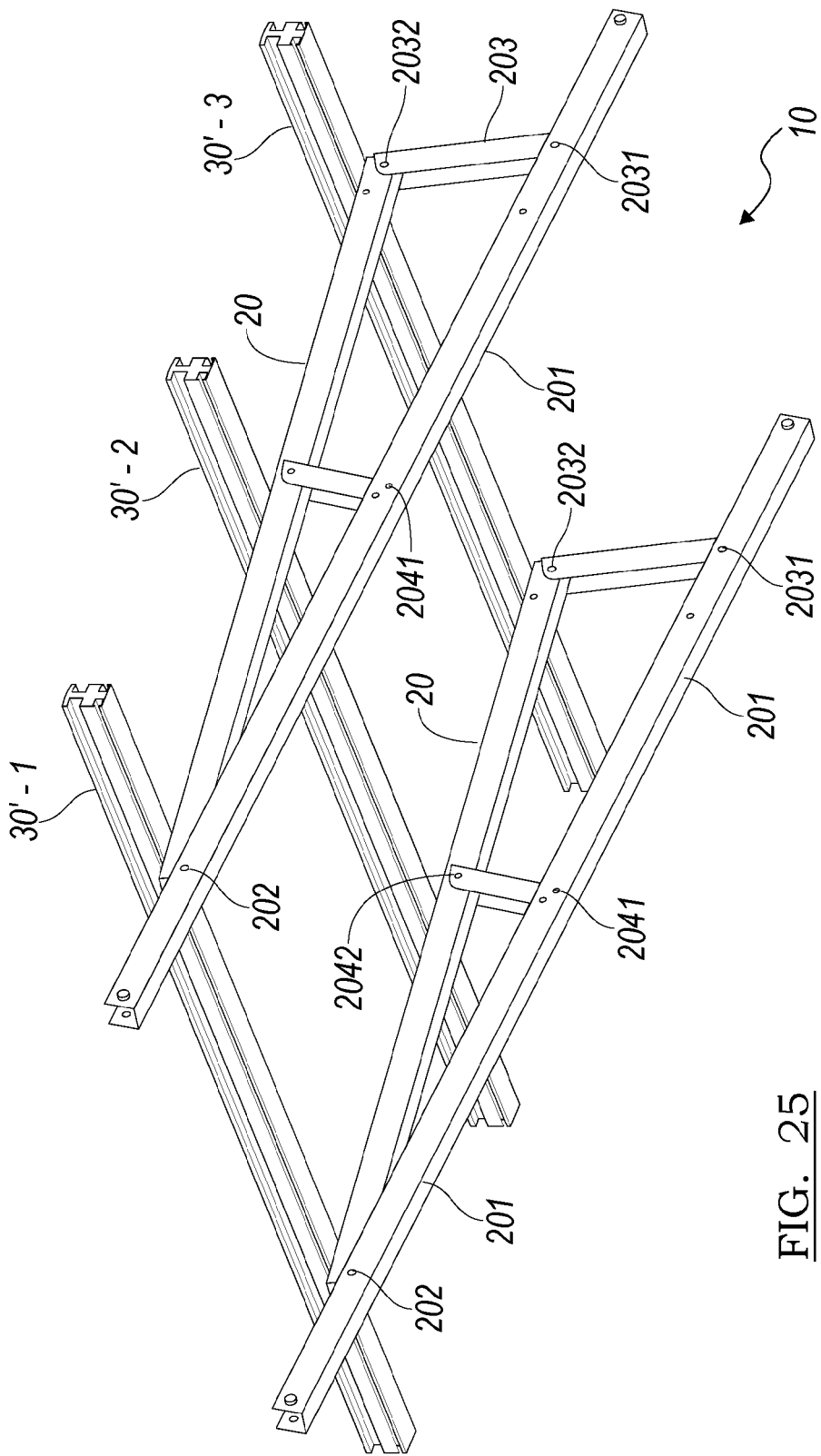
FIG. 25 is a bottom perspective view of the panel support system and the roof interface framework in a fully deployed, assembled and supported position.
Figure 26:
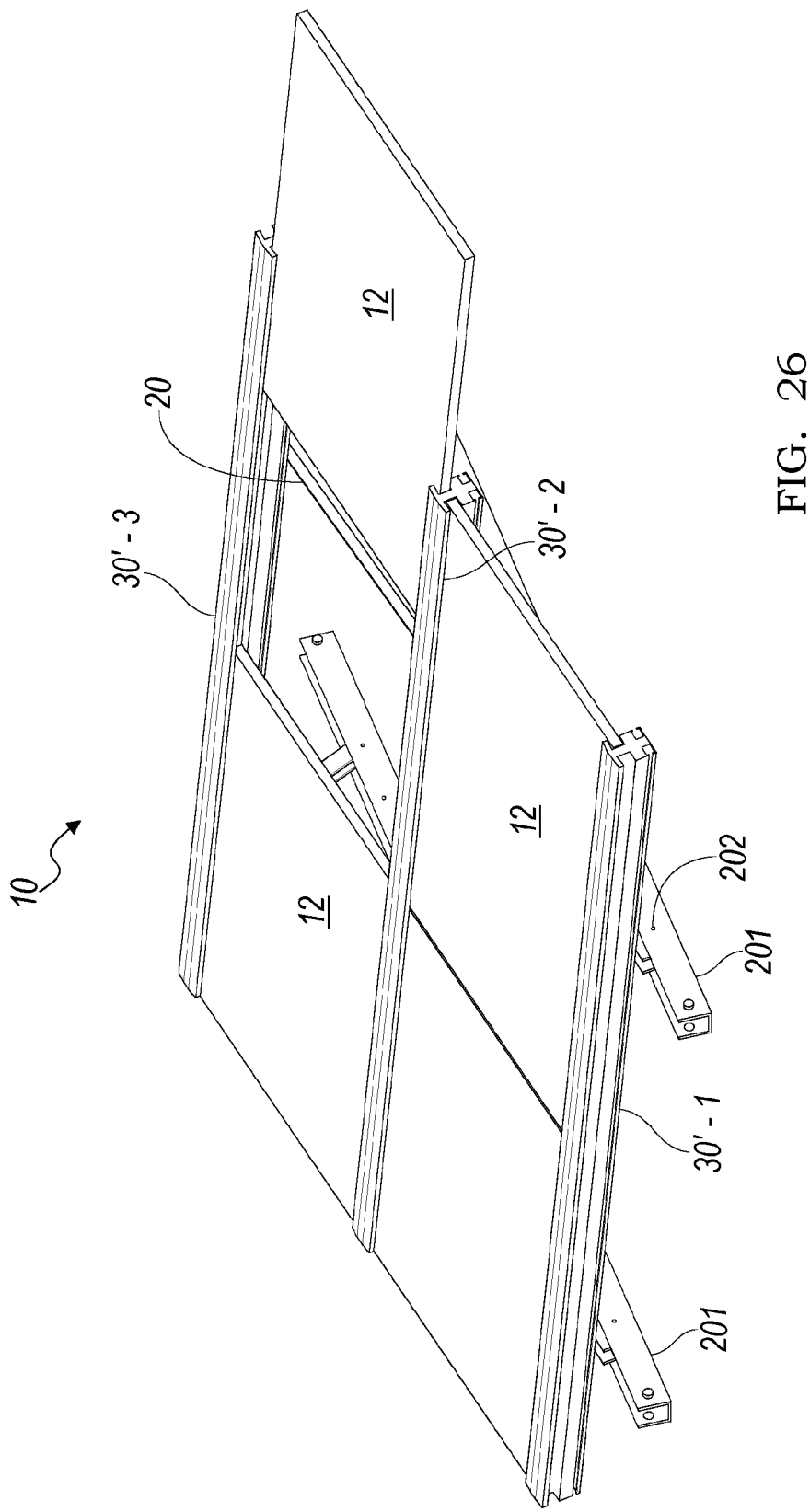
FIG. 26 is a top perspective view showing panels within the support system having the roof interface framework.

As depicted in FIG. 25, the vertical support pairs 203 and 204 have open ends to extend around part of the side walls of lower support joists 20. Once the pivoting connecting structures 2032, 2042 are tightened, a substantially rigid overall structure is achieved. Since the pivoting connectors 2032 and 2042 are preferably constituted by standard bolts and nuts, the pivoting vertical support pairs 203, 204 are easily deployed and changed to alter the tilt of the panel support assembly 10.

It should be clear that since vertical support pairs 204, 203 are easily interchangeable, a wide variety of different vertical support sizes can be used within the operation of the preferred embodiments of the present invention. Accordingly, the panels 12, 12' held by panel support assembly 10 can be laid virtually flat, or can be tilted to a substantially 90° angle with respect to the supporting substrate. This provides a substantial extent of flexibility in use for the present invention, and leads to multiple applications in a wide variety of situations. For example, while solar panels are the preferred subject of the inventive support structure, other types of panels can be used. Examples can include reflective panels, insulating panels, shading panels, wind breaks, decorative screens, or even electromagnetic transmission/reception panels.

FIG. 28 depicts another aspect of the arrangement of pivoting vertical support pairs 203, 204. In particular, the middle vertical support pair 204 is off-center from the panel 12 arrangement held by the support structure 10 constituted by upper support rails 30'-n and lower support joists 20. This is made clear in FIG. 28 by the positioning of the center rail 30-2 where the two panels 12 abut each other. This is a significant structural arrangement since it allows the panel support frame of assembly 10 (constituted by upper support rails 30'-n and lower support joists 20 in this case) to be tilted in a direction opposite to that depicted in FIG. 28, and the other drawings. This feature is particularly important during installation, cleaning and maintenance of the panels as previously discussed.

The necessity for providing the opposite tilt angle is depicted in FIG. 24, which includes two adjacent panel arrays, each having its own panel support structure 10 with roof interface framework 200. When multiple adjacent panel assemblies are used, a new problem is introduced: installing or removing the lower interior panels (designated in FIG. 29 as 1201 and 1202). Even if one of the panel assemblies 10 is tilted upward to an extreme extent, access for installation or removal of inner lower panels 1201, 1202, is very difficult if not impossible. Access to the interior panels 1201, 1202 is easily accomplished by tilting the bi-directional panel support frame 10' of the assembly 10 on the middle vertical support pair 204 in a direction opposite to that depicted in FIG. 28 (after removal of support pair 203). Using this technique, the easy installation and removal of substantial panel arrays become feasible. As a result, easy deployment of large numbers of panel support assemblies 10 in close configuration also becomes feasible, a very desirable attribute if roof space is limited.

One advantage of the present invention is that the size and weight of the overall bi-directional panel support frame 10' and roof interface frame 200 of the assembly 10 in combination with the panels 12, creates a certain level of stability on many roof structures. However, this is not always sufficient to provide a stable arrangement with respect to the panels 12 and the roof. Further, while the present roof interface framework 200 can be attached to a roof with connectors, this is preferably avoided since driving large numbers of connectors through a roof creates its own set of problems. Accordingly, the subject embodiments of the present invention provide other means for creating stability on a roof or roof-like substrate.

Figure 29:
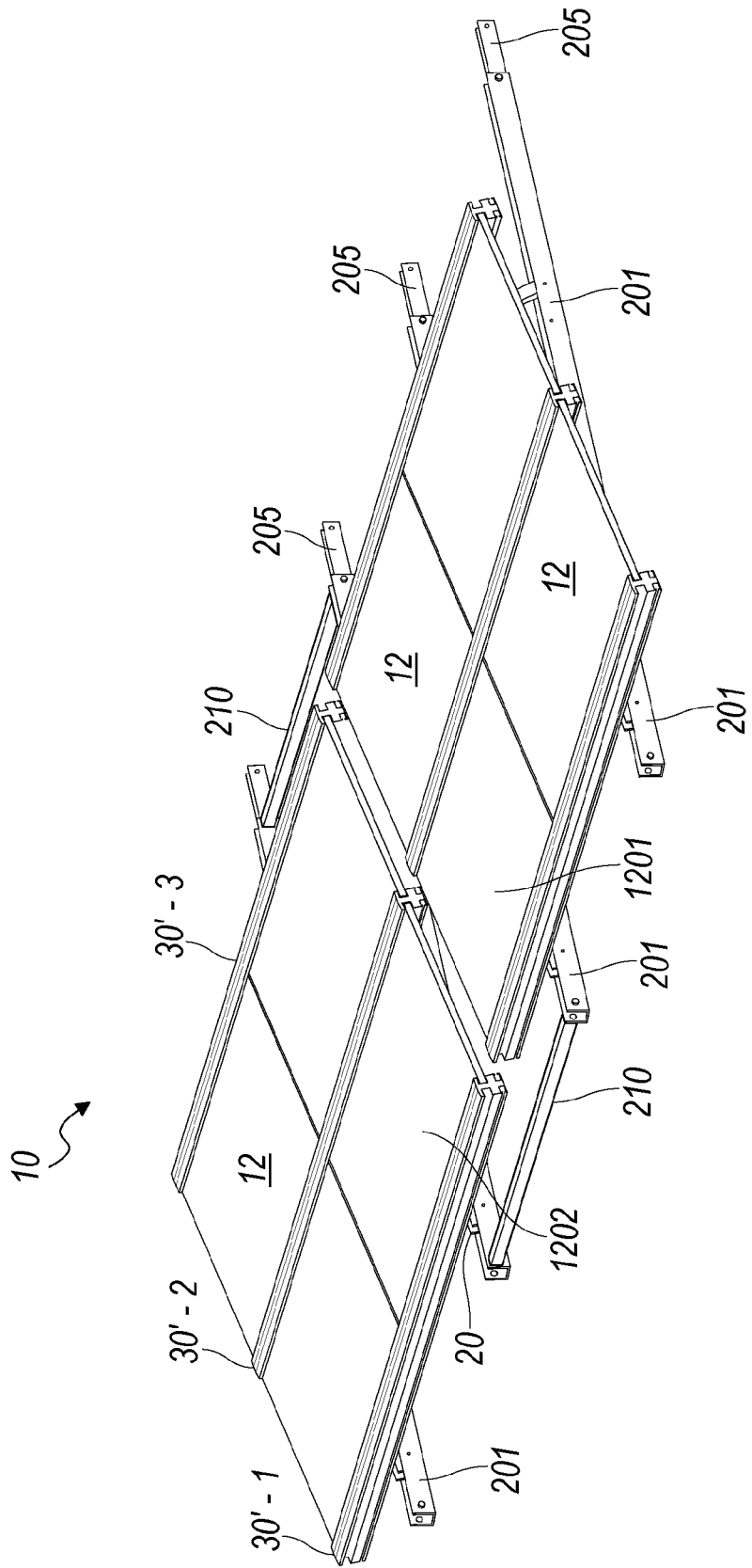
FIG. 29 is a top perspective view of an array (i.e. multiple) panel support systems connected to interlocked roof interface frames.

A key attribute for obtaining stability is found in the two main longitudinal members 201 of each roof interface frame 200. These provide stability by distributing the weight or load of the overall arrangement over a large area of the roof. Additional stability can be obtained by extension legs 205, as depicted in FIG. 29. These legs are constituted by U-shaped channels that fit into the U-shaped channels of main longitudinal members 201 and can be pivoted 180° to extend outward from an end of the main longitudinal members 201. The extra length of members 201 adds additional stability to the overall structure, and can be used to connect to a longitudinally adjacent support assembly 10 to form a column of assemblies. If need be, an additional extension leg (not shown) can be added to the opposite end of the main longitudinal member 201, in the same manner.

One possibility when using one or more sets of extension legs 205 is to create a permanent fixture to the roof using the extension legs 205, and then use a bolt to connect the extension leg 205 to the rest of the main longitudinal member 201. In this manner, a permanent fixture can be made on the roof that will accommodate the roof interface framework 200 permitting easy installation and removal for maintaining a very secure connection to the roof.

Even without a permanent connection to the roof, additional stability can be obtained through the use of extension legs 205, and further through the use of multiple interconnected panel array assemblies 10. FIG. 29 depicts lateral connectors 210 used to add lateral stability within and between adjacent panel array assemblies 10. Notably, a first lateral connector 210 is used to connect the back ends of the first and second, i.e. furthermost, main longitudinal members 201 within the first panel assembly 10. Then, a second lateral connector 210 passes and connects between the second and third adjacent longitudinal members 201, between the first and second panel assemblies 10. It is important to notice that these connectors 210 add lateral stability within a panel assembly 10, as well as between connected assemblies 10. The bolts or other connection devices used to hold extension leg 205 to main longitudinal member 201 can also be used to hold the lateral connectors 210. Again, use of these lateral connectors between adjacent longitudinal members 201 enhances lateral stability and strength within and between connected arrays 10. It should be noted that with the use of extension legs 205 and lateral connectors 210, a wide variety of different interconnected solar array configurations and structural strengths can be achieved. This permits multiple, relatively small individual solar assemblies 10 to be built into large and complex configurations, thereby taking advantage of all of the usable roof space.

Figure 21:
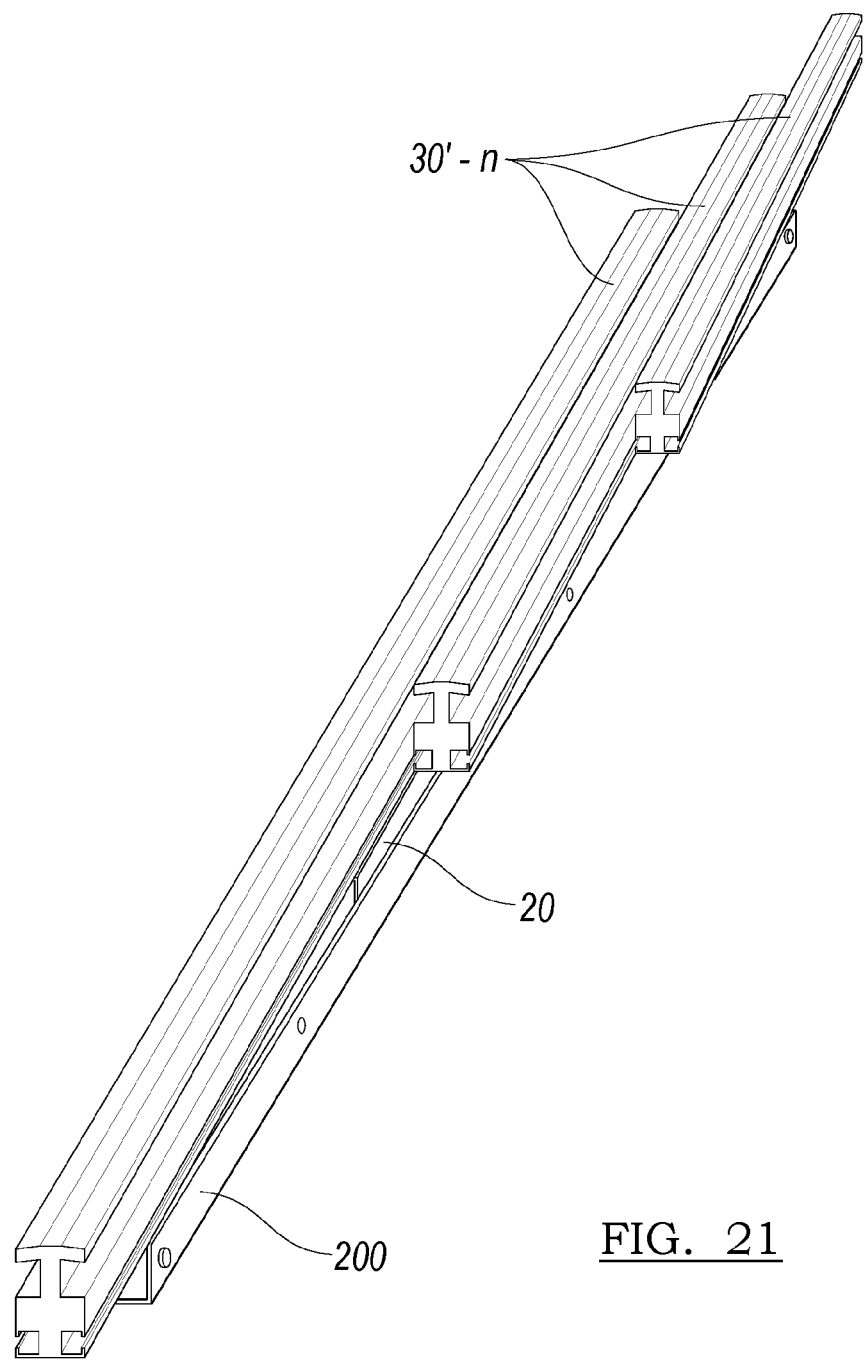
FIG. 21 is a perspective view of the support system and the roof interface system collapsed to a folded position.

A key aspect of the combined panel support system 10 with the roof interface framework 200 is that the entire combined structure can be collapsed and folded in the manner depicted in FIG. 21, i.e. like the bi-directional panel support frame 10' of the assembly 10 attach to tilt brackets 16 and support elements 14 (described above). The folding of the total structure is crucial to ease of transport and later installation. A quick, easy installation using the present invention will save a great deal of money in the deployment of solar panels. The collapsible structure depicted in FIG. 21 includes the roof interface framework 200. As the upper support rails 30'-$n$ are rotated with respect to the lower support joists 20, they are brought together as previously described with respect to the panel support assembly 10 used as a free-field ground rack. Since lower support joists 20 are attached to main longitudinal members 201, the action that draws the lower support joists 20 together will also draw the main longitudinal members 201 together. The result is the folded, easily-transportable package depicted in FIG. 21.

Figure 22:
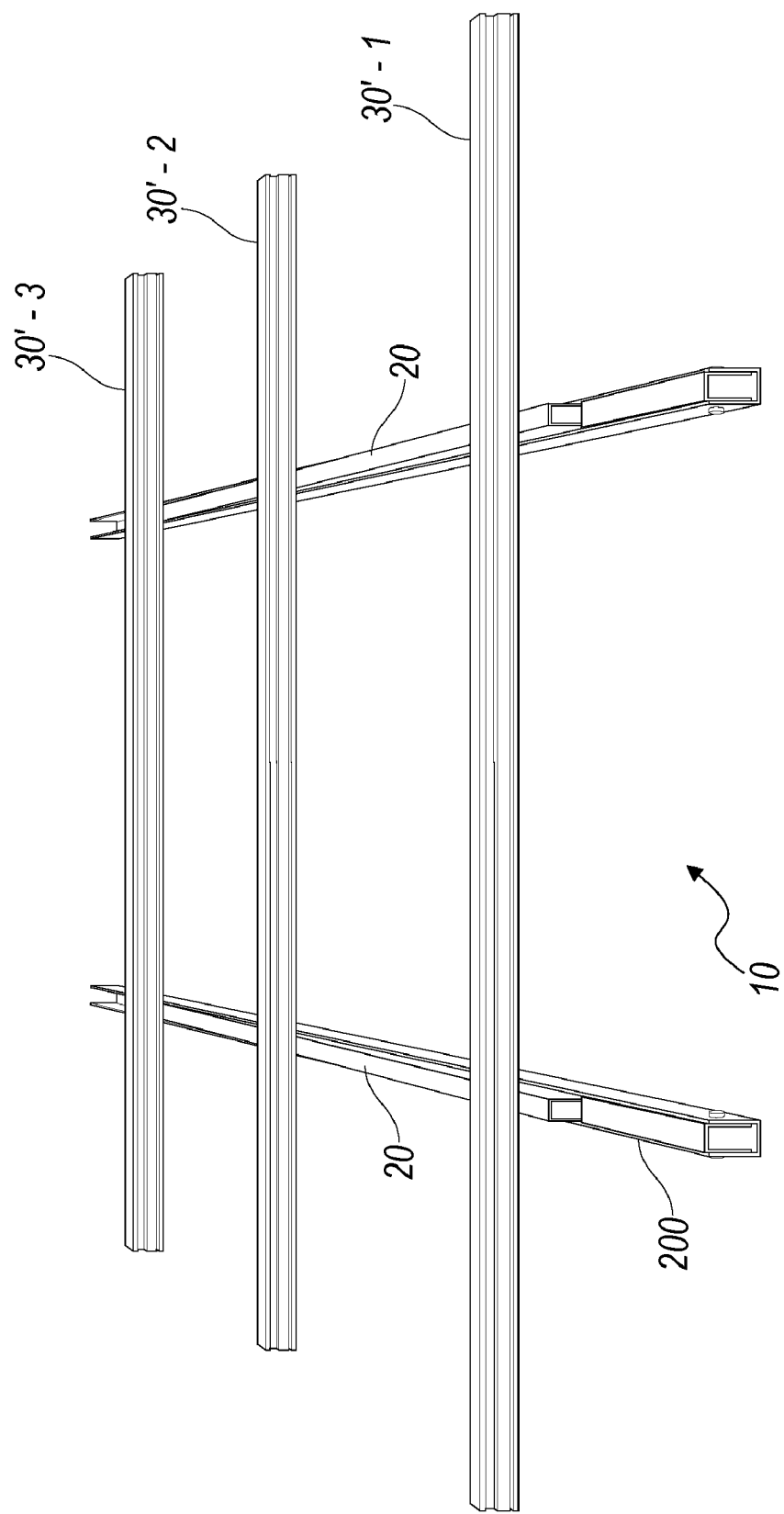
FIG. 22 is a perspective view of the support system and roof interface system shown in FIG. 21, in an open or deployed position.

When the upper support rails 30'-$n$ are pulled away from each other in the folded package of FIG. 21, the entire structure opens up as depicted up in FIG. 22. This opening action forces the lower support joists 20 apart just as the upper support rails 30' are pulled apart. The main longitudinal members 201 are secured along their lengths to the lower support joists 20. Consequently, these two structures (i.e. longitudinal member 201 and its corresponding connected joist 20) remain together during the opening operation.

Normally, during transport, extra connectors or ties (not shown) can be used to hold lower support joists 20 to the U-shaped channels of main longitudinal members 201. This is necessary since the presence of the rotatably vertical support pairs 203, 204 within the U-shaped channel do not permit complete entry by lower support joists 20. Virtually, any type of connector or tie can be used to facilitate this attachment during transport.

Using the structure of the present invention, large complex roof arrays of solar panels can be fabricated off-site, pre-assembled, transported and installed at a mere fraction of the time and expense necessary for conventional arrangements. As described above with reference to the free-field ground rack support assembly 10, there are a number of expedients that are included as part of the present invention to facilitate ease of installation or removal of the panel support system 10. One such feature of the present invention is the nylon washer 24 (described above), which serves to keep the upper rails 30'-$n$ separated from lower support joists 20. While the washer 24 is preferably nylon, any suitable material can be used to perform spacing and lubricating function of the nylon washer. The use of the washer 24 is crucial as previously described, i.e. in order to facilitate easy rotation of upper rail 30'-$n$ with respect to lower support joists 20. As a result, the bi-directional panel support frame 10' can be easily folded and collapsed with the roof interface framework 200, or unfolded and opened.

The spacing provided by washer 24 facilitates the use of other features of the present invention. One such feature is rotation control device 300, as depicted in FIGS. 30 and 31. In order to quickly and easily deploy the bi-directional panel support frame 10' of support assembly 10, some means or device for confining the mutual rotation of the bi-directional structural members 30'-$n$, 20 to a desired angular, unfolded position is essential. Otherwise, a great deal of time would be lost aligning the intersecting structural members 30'-n, 20 and then tightening them in place only after long and exacting measurements are taken at each intersection, as is done with conventional arrays. This necessity makes the installation of conventional arrays more costly, thereby mitigating against upgrades, expansions, or even maintenance. The rotation control, i.e. limiting, device 300 makes certain that the folding or deployment of the bi-directional array of support assembly 10 takes place easily and exactly without extensive measurements or exact tightening processes at each intersection.

Rotation control device 300, as depicted in FIGS. 30A and 30B, has a main flattened body or base plate 301 with an upper facing flange 302 and a lower facing flange 303. These two flanges are arranged at a 90° angle to each other. The rotation control device 300 is attached between at least one lower support joist 20 and its corresponding support rail 30'-n by means of bolt 40 placed through aperture 304. Of course, support rail 30-n can be used in place of rail 30'-n shown in FIG. 30A. The space between structural rail 30'-n and joist 20 created by washers 24 permits the thickness of base plate 301 be accommodated therebetween without undue friction or fouling of either of the structural members with base plate 301. Preferably a thinner separation washer 24 (not shown in FIG. 30A) is used with the rotation control device 300 to fill the remaining gap, facilitate rotation and prevent galvanic interaction between unlike materials, as described above. When the bi-directional panel support frame 10' of support assembly 10 is fully deployed, upper support rails 30'-n are positioned exactly 90° to lower support joists 20 by virtue of the rotation control device 300. Specifically, upper holding flange 302 holds the sidewall of the upper support rail 30'-n while lower holding flange 303 holds a sidewall of the lower support joist 20, as depicted in FIG. 30A. In other words, rotation control device 300 effectively prevents over rotation of the two structural members 30'-n, 20 with respect to each other, so that the structural members are held at the proper 90° angle.

Quick and inexpensive on-site installation is facilitated by an accurate placement of rotation control device 300 during factory assembly, and before shipment to the installation site. In this manner, proper calibration and adjustment need take place only at the factory or staging site. No time is lost at the installation site since the correct placement of rotation control devices 300 facilitates proper deployment of the bi-directional panel support frame 10' of support assembly 10. Accordingly, the major goal of the present invention, a quick, inexpensive on-site installation is facilitated.

In another embodiment of the present invention, the installation site is provided with a "hard" support substrate or structure (such as 14, 16 depicted in FIGS. 1 through 4) so that the bi-directional panel support frame 10' can be bolted to the fixed support surface. If the support surface is like support tilt bracket 16, shown in FIGS. 1 through 4, there is a difficulty in that a great deal of strain is put on the bolts holding support frame 10' to the substrate of the support system 10. The normal approach to such a situation is to substantially tighten the bolts 240 passing through slot 216 to hold the lower support joists 20 to the mounting bracket 16 (as shown, for example, in FIGS. 4A-B and 13A-B) or other hard substrate. This approach has certain inherent difficulties because of the nature of the lower support joists 20. In particular, as previously described, the lower support joists 20 are preferably hollow, i.e. tubular, beams. Substantial tightening of the bolt 240 passing through and holding the lower support joist 20 to its respective mounting bracket, e.g. tilt bracket 16 shown in FIG. 6, can easily deform or otherwise degrade the hollow tube of said joist 20. To compensate, a cap plate 400, as depicted in FIG. 30A over support joist 20, is preferably used to provide additional support against the stress of the tightened attachment bolt 240 connecting said lower support joist 20 to the fixed substrate.

As depicted in FIG. 30C, cap plate 400 is constituted by an upper surface 401 with a bolt aperture 403. Side flanges 402 fit on either side of the lower support joists 20. Beveled protrusions 404 extend beneath the top plate 401 and serve to help grip the top of lower support joist 20.

Further, it should be understood that cap plate 400 can be used anywhere where a bolt will exert extreme pressure on a relatively fragile rail or joist. Accordingly, as the present invention is adapted to different configurations, cap plate 400 can be placed as needed in the overall assembly.

While a number of embodiments have been described as examples of the present invention, the present invention is not limited thereto. Rather, the present invention should be construed to include every and all modifications, permutations, variations, adaptations, derivations, evolutions and embodiments that would occur to one having skill in this technology and being in possession of the teachings of the present application. Accordingly, the present invention should be construed as being limited only by the following claims.

What is claimed is:

1. A collapsible panel support system having a unitarily foldable and unfoldable bi-directional panel support array of intersecting structural members including a first group of lower support joists and a second group of upper panel rails, said first group being rotatably connected to said second group, said collapsible panel support system comprising:
    a) a substrate interface framework having longitudinal members configured to extend on a substrate for supporting said panel support system and to at least partially contain at least two said lower support joists;
    b) at least one pivoting connector, pivotally attaching one end of at least one said lower support joist to a first end of at least one longitudinal member of said substrate interface framework, facilitating vertical rotation of said bi-directional support array with respect to said substrate interface framework and,
    c) a bolt connecting each intersection of said upper panel rails and said lower support joists, and non-conductive washers at each said bolt, between said lower support joists and said upper panel rails.

2. The collapsible panel support system of claim 1, still further comprising at least one rotation stop located at one of said bolts between coupled lower support joist and upper panel rail, said rotation stop comprising a first flange overlapping a side of said coupled lower support joist, and a second flange overlapping a side of said coupled upper panel rail.

3. The collapsible panel support system of claim 1, wherein said substrate interface framework comprises at least two of said longitudinal members, each comprising a U-shaped channel.

4. The collapsible panel support system of claim 3, wherein each longitudinal member of said substrate interface framework further comprises a first pivoting vertical support structure arranged at a second end of said longitudinal member.

5. The collapsible panel support system of claim 4, wherein each longitudinal member of said substrate interface framework further comprises a second pivoting vertical support located between said first vertical support and said pivoting connector.

6. The collapsible panel support system of claim 5, wherein said second vertical support is located in an off-center position between said pivoting connector and said first vertical support, along said lower support joist.

7. The collapsible panel support system of claim 6, wherein each longitudinal member further comprises a pivoting extension leg at said second end of said longitudinal member.

8. The collapsible panel support system of claim 7, wherein each longitudinal member further comprises a second extension leg at said first end of said longitudinal member.

9. The collapsible panel support system of claim 6, further comprising at least one lateral support member adapted to connect to adjacent substrate interface frameworks.

10. A collapsible panel support system having a unitarily foldable and unfoldable bi-directional panel support array of intersecting structural members including a first group of lower support joists and a second group of upper panel rails, said first group being rotatably connected to said second group, said collapsible panel support system comprising:
   a) a substrate interface framework having longitudinal members configured to extend on a substrate for supporting said panel support system and to at least partially contain at least two said lower support joists;
   b) at least one pivoting connector, pivotally attaching one end of at least one said lower support joist to a first end of at least one longitudinal member of said substrate interface framework, facilitating vertical rotation of said bi-directional support array with respect to said substrate interface framework;
      wherein, said substrate interface framework comprises at least two of said longitudinal members, each comprising a U-shaped channel;
      wherein, each longitudinal member of said substrate interface framework further comprises a first pivoting vertical support structure arranged at a second end of said longitudinal member;
      wherein, each longitudinal member of said substrate interface framework further comprises a second pivoting vertical support located between said first vertical support and said pivoting connector;
      wherein, said second vertical support is located in an off-center position between said pivoting connector and said first vertical support, along said lower support joist; and,
   c) at least one lateral support member adapted to connect to adjacent substrate interface frameworks.

* * * * *